US012763925B2

(12) United States Patent
Song et al.

(10) Patent No.: US 12,763,925 B2
(45) Date of Patent: Oct. 13, 2026

(54) METHOD AND APPARATUS WITH LINEARLY HOMOMORPHIC ENCRYPTION

(71) Applicants: Samsung Electronics Co., Ltd., Suwon-si (KR); Seoul National University R&DB Foundation, Seoul (KR)

(72) Inventors: Yongsoo Song, Seoul (KR); Seonhong Min, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 35 days.

(21) Appl. No.: 19/036,281

(22) Filed: Jan. 24, 2025

(65) Prior Publication Data

US 2025/0392440 A1 Dec. 25, 2025

(30) Foreign Application Priority Data

Jun. 20, 2024 (KR) ........................ 10-2024-0080408
Oct. 4, 2024 (KR) ........................ 10-2024-0135140

(51) Int. Cl.
*G06F 7/04* (2006.01)
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC .............................. H04L 9/008; H04L 9/0618
See application file for complete search history.

(56) References Cited

U.S. PATENT DOCUMENTS

2014/0177828 A1* 6/2014 Loftus .................. H04L 9/0852 380/44
2019/0312728 A1* 10/2019 Poeppelmann ....... H04L 9/0662
(Continued)

FOREIGN PATENT DOCUMENTS

CN 117857008 A 4/2024
KR 10-1965628 B 4/2019
(Continued)

OTHER PUBLICATIONS

Sebert et al, Combining Homomorphic Encryption and Differential Privacy in Federated Learning, Aug. 23, 2023, IEEE, pp. 1-7. (Year: 2023).*
(Continued)

*Primary Examiner* — Philip J Chea
*Assistant Examiner* — Jenise E Jackson
(74) *Attorney, Agent, or Firm* — NSIP Law

(57) ABSTRACT

A linearly homomorphic encryption (LHE) method and apparatus are disclosed. An LHE method that provides circuit privacy, according to one embodiment, is performed by a computing device and may include: receiving a homomorphic ciphertext of input data from a sender; sampling a coefficient of a linear function from a first discrete Gaussian distribution corresponding to a coset of a plaintext modulus; sampling a first noise from a predefined second discrete Gaussian distribution; and generating a homomorphic ciphertext of an evaluation result on the input data from the linear function, based on the sampled coefficient of the linear function and the sampled first noise.

20 Claims, 11 Drawing Sheets

(56) References Cited

U.S. PATENT DOCUMENTS

| | | | | |
|---|---|---|---|---|
| 2023/0161899 | A1* | 5/2023 | Yang | G06F 21/6254 726/26 |
| 2025/0175322 | A1* | 5/2025 | Bourgerie | H04L 9/008 |

FOREIGN PATENT DOCUMENTS

| | | | |
|---|---|---|---|
| KR | 10-2023-0149708 | A | 10/2023 |
| WO | WO 2023/204534 | A1 | 10/2023 |

OTHER PUBLICATIONS

Korchi et al, A Practical Use Case of Homomorphic Encryption, Oct. 4, 2019, IEEE, pp. 328-335. (Year: 2019).*

De Castro, Leo, Chiraag Juvekar, and Vinod Vaikuntanathan. "Fast vector oblivious linear evaluation from ring learning with errors." *Proceedings of the 9th on Workshop on Encrypted Computing & Applied Homomorphic Cryptography*. 2021.

Keller, Marcel, Valerio Pastro, and Dragos Rotaru. "Overdrive: Making SPDZ great again." *Annual International Conference on the Theory and Applications of Cryptographic Techniques*. Cham: Springer International Publishing, 2018.

Al Badawi, Ahmad, et al. "Privft: Private and fast text classification with homomorphic encryption." *IEEE Access* 8 (2020): 226544-226556.

Chongchitmate, Wutichai, et al. "Psi from ring-ole." *Proceedings of the 2022 ACM SIGSAC Conference on Computer and Communications Security*. 2022.

Fan, Junfeng, and Frederik Vercauteren. "Somewhat practical fully homomorphic encryption." *Cryptology ePrint Archive* (2012).

* cited by examiner

300

Functionality $F_{KeyGen}$

Input: a public parameter $pp = (n, q, \rho)$ and a secret key distribution $\chi$.
Output:

1. Sample a secret key $s \leftarrow \chi$. Sample $a \leftarrow R_q$ and $e \leftarrow D_{\mathbb{Z}^n,\rho}$, and set the public key as $\mathbf{p} = (-as + e, a) \in R_q^2$.
2. Send s and p to the receiver.
3. Send p to the sender.

FIG. 3

400

Functionality $F_{OLE}$

Input:

1. A message $x \in R_t$ from the receiver
2. Coefficients a, b $\in R_t$ of a linear function $f(z) = az + b$ from the sender.

Output:

1. Send $f(x) = ax + b \in R_t$ to the receiver.
2. The sender receives nothing.

FIG. 4

600

Recommended parameter sets for the semi-honest OLE with security level $\lambda = 128$.

| log t | n | log σ | log τ | log q |
|---|---|---|---|---|
| 16 | $2^{12}$ | 19 | 36 | 72 |
| 32 | $2^{12}$ | 35 | 52 | 104 |
| 64 | $2^{13}$ | 67 | 85 | 170 |
| 80 | $2^{13}$ | 83 | 101 | 202 |
| 128 | $2^{14}$ | 131 | 150 | 300 |

FIG. 6

700

Protocol $\Pi_{OLE}^{passive}$

Receiver's input: A message $x \in R_t$

Sender's input: The coefficients $a, b \in R_t$ of a linear function $f(z) = az + b$

---

Setup Phase: The receiver generates a secret key $s \in R$ and a public key $\mathbf{p} = (p_0, p_1) \in R_q^2$.

Encryption Phase: The receiver generates a ciphertext $\mathbf{c} \leftarrow \mathrm{Enc}_p(x)$ and sends it to the sender.

Evaluation Phase: The sender performs $\mathbf{c'} = \mathrm{RandLinEval}_p(\mathbf{c}, a, b)$ and sends it to the receiver.

Decryption Phase: The receiver outputs $y = \mathrm{Dec}_s(\mathbf{c'})$.

FIG. 7

800

Protocol $\Pi_{OLE}^{active}$

Receiver's input: A message $x \in R_t$

Sender's input: The coefficients $a, b \in R_t$ of a linear function $f(z) = az + b$

---

Setup Phase: The receiver generates a secret key $s \in R$ and a public key $\mathbf{p} = (p_0, p_1) \in R_q^2$.

Encryption Phase: The receiver and sender engage in the protocol $\Pi_{PoK1}$ as the prover and verifier, respectively. If it succeeds, the sender accepts a ciphertext $\mathbf{c} \in R_q^2$ from the receiver. Otherwise, the parties abort.

Evaluation Phase: The receiver and sender engage in the protocol $\Pi_{PoK2}$ as the verifier and prover, respectively. If it succeeds, the receiver accepts a ciphertext $\mathbf{c}' \in R_q^2$ from the sender. Otherwise, the parties abort.

Decryption Phase: The receiver outputs $y \leftarrow Dec_s(\mathbf{c}')$.

FIG. 8

900

Protocol $\Pi_{PoK1}$

Receiver (Prover)'s input

A message $x \in R_t$

A public key $\mathbf{p} = (p_0, p_1) \in R_q^2$

Sender (Verifier)'s input

A public key $\mathbf{p} = (p_0, p_1) \in R_q^2$

---

Encryption Phase

1. The receiver samples an encryption randomness $e \leftarrow D^3_{Z^n, \rho_1}$.
2. The receiver sends $\mathbf{c} = \mathrm{Enc}_p(x, \mathbf{e}) \in R_q^2$ to the sender.

Commitment Phase

1. The receiver samples $z_i \leftarrow Rt$ and $\mathbf{f}_i \leftarrow D^3_{Z^n, \rho_2}$, then computes $\mathbf{d}_i = \mathrm{Encp}(z_i, \mathbf{f}_i) \in R_q^2$ for $1 \leq i \leq \ell$.
2. The receiver sends comm = $(\mathbf{d}_1, \ldots, \mathbf{d}_\ell)$ to the sender.

Challenge Phase

1. Upon receiving comm = $(\mathbf{d}_1, \ldots, \mathbf{d}_\ell)$, the sender samples $\alpha_1, \ldots, \alpha_\ell \leftarrow C$.
2. The sender sends chal = $(\alpha_1, \ldots, \alpha_\ell)$ to the receiver.

Response Phase

1. Upon receiving chal = $(\alpha_1, \ldots, \alpha_\ell)$, the receiver computes $\mathbf{g}_i = \mathbf{f}_i + \alpha_i \mathbf{e} \in R^3$ and $w_i = z_i + \alpha_i x \in R_t$ for $1 \leq i \leq \ell$.
2. The receiver sends resp = $((w_1, \mathbf{g}_1), \ldots, (w_\ell, \mathbf{g}_\ell))$ to the sender.

Verification Phase

1. Upon receiving resp = $((w_1, \mathbf{g}_1), \ldots, (w_\ell, \mathbf{g}_\ell))$, the sender checks whether the following holds for all $1 \leq i \leq \ell$:

$$\mathrm{Enc}_p(w_i, \mathbf{g}_i) = \mathbf{d}_i + \alpha_i \mathbf{c} \pmod q,$$
$$\|\mathbf{g}_i\|_\infty \leq B_{p1} + B_{p2}.$$

2. The sender outputs accept if all checks pass, otherwise reject.

FIG. 9

1000

Protocol $\Pi_{PoK2}$

Receiver (Verifier)'s input

A public key $\mathbf{p} = (p_0, p_1) \in R_q^2$

A ciphertext $\mathbf{c} = (c_0, c_1) \in R_q^2$

Sender (Prover)'s input

A public key $\mathbf{p} = (p_0, p_1) \in R_q^2$

A ciphertext $\mathbf{c} = (c_0, c_1) \in R_q^2$

The coefficients $a, b \in R_t$ of a linear function $f(z) = az + b$ over $R_t$

---

Evaluation Phase

1. The sender samples $r \leftarrow D_{a+t\mathbb{Z}^n, \sigma_1}$.
2. The sender samples $\mathbf{e}' = (e'_0, e'_1, e'_2) \leftarrow D^3_{\mathbb{Z}^n, \tau_1}$.
3. The sender computes $\mathbf{c}' = (c'_0, c'_1) \leftarrow r \cdot \mathbf{c} + \mathrm{Enc}_p(b, \mathbf{e}') \in R_q^2$ and sends it to the receiver.

Commitment Phase

1. The sender samples $u_i \leftarrow D_{\mathbb{Z}^n, \sigma_2}$, $h_i \leftarrow R_t$ and $\mathbf{f}'_i = (f'_{i,0}, f'_{i,1}, f'_{i,2}) \leftarrow D^3_{\mathbb{Z}^n, \tau_2}$, then computes $\mathbf{d}'_i = u_i \cdot \mathbf{c} + \mathrm{Enc}_p(h_i, \mathbf{f}'_i) \in R_q^2$ for $1 \leq i \leq \ell$.
2. The sender sends $\mathrm{comm}' = (\mathbf{d}'_1, \ldots, \mathbf{d}'_\ell)$ to the receiver.

Challenge Phase

1. Upon receiving the commitment, the receiver samples $\alpha'_1, \ldots, \alpha'_\ell \leftarrow C$.
2. The receiver sends $\mathrm{chal}' = (\alpha'_1, \ldots, \alpha'_\ell)$ to the sender.

Response Phase

1. Upon receiving $\mathrm{chal}' = (\alpha'_1, \ldots, \alpha'_\ell)$, the sender computes $v_i = u_i + \alpha'_i r \in \mathbf{R}$, $k_i = h_i + \alpha'_i b \in R_t$, and $\mathbf{g}'_i = \mathbf{f}'_i + \alpha'_i \mathbf{e}' \in R^3$ for $1 \leq i \leq \ell$.
2. The sender sends $\mathrm{resp}' = ((v_1, k_1, \mathbf{g}'_1), \ldots, (v_\ell, k_\ell, \mathbf{g}'_\ell))$ to the receiver.

Verification Phase

1. Upon receiving $\mathrm{resp}' = ((v_1, k_1, \mathbf{g}'_1), \ldots, (v_\ell, k_\ell, \mathbf{g}'_\ell))$, the receiver checks whether the following holds for all $1 \leq i \leq \ell$:

$$v_i \cdot \mathbf{c} + \mathrm{Enc}_p(k_i, \mathbf{g}'_i) = \mathbf{d}'_i + \alpha'_i \mathbf{c}' \pmod{q},$$
$$\|v_i\|_\infty \leq B_{\sigma 1} + B_{\sigma 2},$$
$$\|\mathbf{g}'_i\|_\infty \leq B_{\tau 1} + B_{\tau 2}.$$

2. The receiver outputs accept if all checks pass, otherwise reject.

FIG. 10

METHOD AND APPARATUS WITH LINEARLY HOMOMORPHIC ENCRYPTION

CROSS-REFERENCE TO RELATED APPLICATIONS

This application claims the benefit under 35 USC § 119(a) of Korean Patent Application No. 10-2024-0080408 filed on Jun. 20, 2024, and Korean Patent Application No. 10-2024-0135140 filed on Oct. 4, 2024, in the Korean Intellectual Property Office, the entire disclosures of which are incorporated herein by reference for all purposes.

BACKGROUND

1. Field

The following description relates to a method and apparatus with linearly homomorphic encryption (LHE) that provides circuit privacy.

2. Description of Related Art

A homomorphic encryption (HE) system supports computations (or operations) on encrypted data. For example, linearly homomorphic encryption (LHE), which supports computations of linear functions, is used in various situations. When designing an HE-based encryption protocol, circuit privacy, in addition to data privacy, may be desirable. Circuit privacy involves protecting information about circuits (i.e., algorithms or computational processes) for computations, in addition to data encrypted during the performance of the computations, such that a ciphertext output as a result of a homomorphic operation on a circuit does not leak any information about the circuit. For example, a lattice-based HE scheme uses noise flooding or iterative fully homomorphic encryption (FHE) bootstrapping to achieve circuit privacy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following example embodiments may provide an effective linearly homomorphic encryption (LHE) method that provides circuit privacy based on a Brakerski/Fan-Vercauteren (BFV) scheme.

The following example embodiments may provide an LHE method that provides circuit privacy without using noise flooding or fully homomorphic encryption (FHE) bootstrapping, while maintaining low computational cost and allowing a ciphertext modulus to be kept polynomial with respect to a security parameter.

Additional aspects of example embodiments will be set forth in part in the description which follows and, in part, will be apparent from the description, or may be learned by practice of the disclosure.

In one or more general aspects, an LHE method that provides circuit privacy includes: receiving a homomorphic ciphertext of input data from a sender; sampling a coefficient of a linear function from a first discrete Gaussian distribution corresponding to a coset of a plaintext modulus; sampling a first noise from a predefined second discrete Gaussian distribution; and generating, based on the sampled coefficient of the linear function and the sampled first noise, a homomorphic ciphertext of an evaluation result on the input data from the linear function.

The homomorphic ciphertext of the input data may be generated by encrypting a result of a number-theoretic transform (NTT) operation corresponding to the plaintext modulus of the input data, based on a public key corresponding to a secret key of the sender and a second noise sampled from a third discrete Gaussian distribution.

The receiving of the homomorphic ciphertext of the input data may include further receiving the public key corresponding to the homomorphic ciphertext of the input data.

The generating of the homomorphic ciphertext of the evaluation result may include: encrypting a constant term of the linear function, based on the public key corresponding to the homomorphic ciphertext of the input data, the first noise, and a ciphertext modulus; and generating the homomorphic ciphertext of the evaluation result by adding the encrypted constant term of the linear function to a product of the sampled coefficient of the linear function and the homomorphic ciphertext of the input data.

The linear function may be defined based on a slope coefficient and a constant term coefficient on a polynomial ring and a residue ring for the plaintext modulus.

The homomorphic ciphertext of the input data may include a Brakerski/Fan-Vercauteren (BFV) ciphertext.

The first discrete Gaussian distribution may include a discrete Gaussian distribution corresponding to a first width parameter in an integer lattice space of the coset of the plaintext modulus that is an equivalence class of a modulo operation on the coefficient of the linear function and the plaintext modulus.

The second discrete Gaussian distribution may include a discrete Gaussian distribution in an integer lattice space corresponding to a second width parameter.

The first width parameter of the first discrete Gaussian distribution and the second width parameter of the second discrete Gaussian distribution may be determined based on a smoothing parameter of the integer lattice space of the coset and a stochastic maximum value of the third discrete Gaussian distribution in which the second noise corresponding to the homomorphic ciphertext of the input data is sampled.

The LHE method may further include transmitting the homomorphic ciphertext of the evaluation result to the sender.

The sender may acquire the evaluation result on the input data from the linear function by decrypting the homomorphic ciphertext of the evaluation result based on the secret key corresponding to the homomorphic ciphertext of the input data.

In one or more general aspects, an electronic device includes: one or more processors; and a memory storing instructions. The instructions may, when executed by the one or more processors, cause the electronic device to: receive a homomorphic ciphertext of input data from a sender; sample a coefficient of a linear function from a first discrete Gaussian distribution corresponding to a coset of a plaintext modulus; sample a first noise from a predefined second discrete Gaussian distribution; and generate, based on the sampled coefficient of the linear function and the sampled first noise, a homomorphic ciphertext of an evaluation result on the input data from the linear function.

The homomorphic ciphertext of the input data may be generated by encrypting a result of an NTT operation corresponding to the plaintext modulus of the input data, based on a public key corresponding to a secret key of the sender and a second noise sampled from a third discrete Gaussian distribution.

The receiving of the homomorphic ciphertext of the input data may include further receiving the public key corresponding to the homomorphic ciphertext of the input data.

The generating of the homomorphic ciphertext of the evaluation result may include: encrypting a constant term of the linear function, based on the public key corresponding to the homomorphic ciphertext of the input data, the first noise, and a ciphertext modulus; and generating the homomorphic ciphertext of the evaluation result by adding the encrypted constant term of the linear function to a product of the sampled coefficient of the linear function and the homomorphic ciphertext of the input data.

The first discrete Gaussian distribution may include a discrete Gaussian distribution corresponding to a first width parameter in an integer lattice space of the coset of the plaintext modulus that is an equivalence class of a modulo operation on the coefficient of the linear function and the plaintext modulus.

The second discrete Gaussian distribution may include a discrete Gaussian distribution in an integer lattice space corresponding to a second width parameter.

The first width parameter of the first discrete Gaussian distribution and the second width parameter of the second discrete Gaussian distribution may be determined based on a smoothing parameter of the integer lattice space of the coset and a stochastic maximum value of the third discrete Gaussian distribution in which the second noise corresponding to the homomorphic ciphertext of the input data is sampled.

The instructions may, when executed by the one or more processors, cause the electronic device further to transmit the homomorphic ciphertext of the evaluation result to the sender.

Other features and aspects will be apparent from the following detailed description, the drawings, and the claims.

BRIEF DESCRIPTION OF THE DRAWINGS

FIG. 3 illustrates an example of a secret key generation function according to one or more example embodiments.

FIG. 4 illustrates an example of an oblivious linear evaluation (OLE) functionality according to one or more example embodiments.

FIG. 6 illustrates an example of a set of parameters according to one or more example embodiments.

FIG. 7 illustrates an example of a semi-honest OLE protocol to which an LHE method is applied according to one or more example embodiments.

FIG. 8 illustrates an example of a maliciously-secure OLE protocol to which an LHE method is applied according to one or more example embodiments.

FIG. 9 illustrates an example of a first proof of knowledge (PoK) protocol of a maliciously-secure OLE protocol according to one or more example embodiments.

FIG. 10 illustrates an example of a second Pok protocol of a maliciously-secure OLE protocol according to one or more example embodiments.

Figure 1:
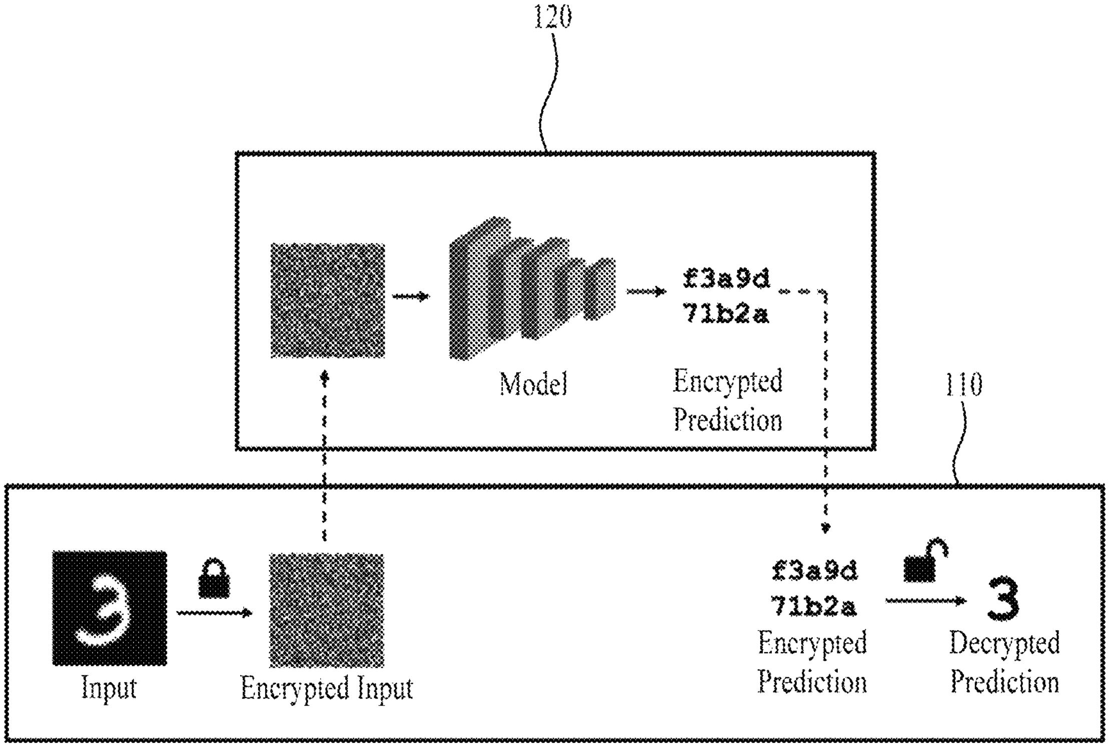
FIG. 1 illustrates an example of a homomorphic encryption (HE) system according to one or more example embodiments.

Throughout the drawings and the detailed description, unless otherwise described or provided, the same or like drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between"

and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

The description below includes mathematical notation and equations. The mathematical description herein is a language for efficiently guiding to an engineer or the like on how to formulate source code (or a circuit description) that is analogous to the mathematical description and that can be compiled into executable instructions executable by a processor to cause the processor to perform operations analogous to the mathematical descriptions. In short, the subject of this disclosure is hardware and/or instructions (stored in hardware) configured as described by the mathematical (and text) description herein. The mathematical description herein could be presented in equivalent text, but such textual description would be highly verbose and difficult for an engineer to interpret.

FIG. 1 illustrates an example of a homomorphic encryption (HE) system according to one or more example embodiments.

Referring to FIG. 1, an HE system of one or more example embodiments may include a client 110 and a server 120 as entities.

In the HE system, the server 120 provides data processing-based services to the client 110 without directly exposing data held by the client 110 to the server 120. In an example, the services provided by the server 120 may include artificial intelligence (AI) services.

Homomorphic encryption, or HE, refers to an encryption technique that allows encrypted data to be computed without decryption such that, when various computations (or operations) (e.g., evaluating a linear function) are performed in a homomorphically encrypted state, the results are the same as the results from computations (or operations) in an unencrypted state. That is, the decrypted data may be equivalent to the original unencrypted (plaintext) data as if the various computations had been performed thereon.

The client 110 may be an entity that accesses a service from the server 120. The client 110 may also be referred to as a service using entity, a service user, a data owner, and the like. The client 110 may encrypt its data (e.g., images) based on an HE technique (e.g., module(s) of instructions that implement the HE scheme) via a client terminal and transmit the encrypted data to the server 120. The client terminal may also be referred to as a user terminal or user device.

The server 120 may receive the encrypted data from the client 110, perform an AI computation (or operation) on the encrypted data, and transmit a result (still in encrypted form) to the client 110. The server 120 may also be referred to as a service provider, a service providing entity, and the like.

The server 120 may provide various AI services to the client 110. For example, the server 120 may provide the client 110 with services where user data confidentiality (or privacy) is important, such as, for example, facial recognition or mask detection.

The HE system of one or more example embodiments may correspond to a linearly homomorphic encryption (LHE) system that ensures (or provides) circuit privacy in addition to user data privacy. HE that supports computations (or operations) of linear functions may be referred to as linearly homomorphic encryption or LHE.

The HE system of one or more example embodiments may perform LHE methods for providing circuit privacy. Using the LHE methods described below, the HE system of one or more example embodiments may provide circuit privacy at low computational cost possibly without using noise flooding or fully homomorphic encryption (FHE) bootstrapping.

The LHE method of one or more example embodiments may be applied to an oblivious linear evaluation (OLE) protocol and/or a multi-party computation (MPC) protocol.

OLE may be an arithmetic analog of oblivious transfer. OLE may be a protocol between two parties where a sender has $a, b \in R$ and a receiver has $x \in R$, where R is a finite ring. When the protocol ends, the receiver may acquire a value of "$ax+b \in R$" with no information about "a" and "b," and the sender may have no information about "x." OLE may be used as a basic component for various encryption protocols and may be beneficial for secure MPC, zero-knowledge proof (ZKP), and private set intersection (PSI).

LHE that provides circuit privacy may include a two-round OLE protocol with passive security. Methods or schemes described below may be used to achieve malicious security and semi-honest security of the OLE protocol. Both an OLE protocol for achieving malicious security and an OLE protocol for achieving semi-honest security, which are described below, may inherit compressed HE parameters of the LHE method, and may thus consume a lower communication cost than a noise flooding method. Further, semi-honest OLE of one or more example embodiments may be asymptotically quasi-optimal (AQO). In addition, the protocol of one or more example embodiments may be more intuitive than AQO-OLE that relies on a prior correlation extractor.

An MPC preprocessing protocol may be divided into an offline phase and an online phase. In the offline phase, before an input value or a circuit to be used for computation is determined, the parties may generate correlated random values (e.g., Beaver's triples). Subsequently, in the online phase, a secure computation may be performed using the correlated random values. A core idea of an MPC preprocessing model may be to move a computation-heavy encryption task to the offline phase to have high efficiency in the online phase.

The methods or schemes described below may be used to perform preprocessing of a secure scalable protocol for dishonest majority multi-party computation(SPDZ)-style protocol on an actively corrupted majority. The LHE method that provides circuit privacy, which is described below, may be used to significantly reduce the communication cost of the MPC preprocessing protocol.

Figure 2:
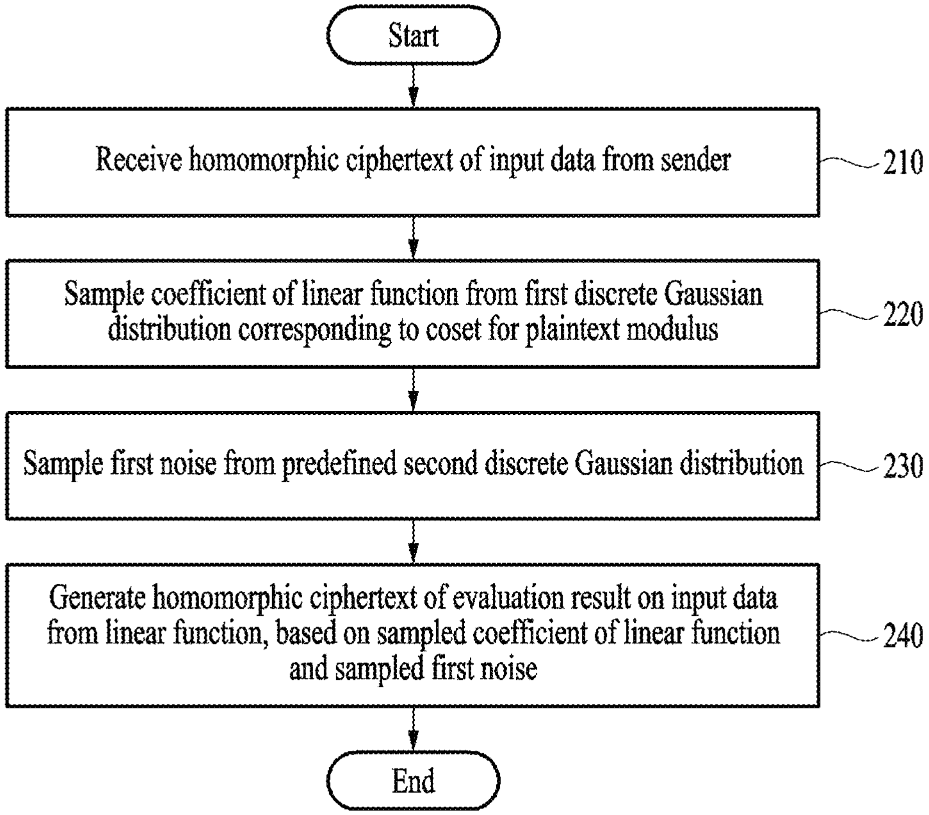
FIG. 2 illustrates an example operational flow of a linearly homomorphic encryption (LHE) method for providing circuit privacy according to one or more example embodiments.

FIG. 2 illustrates an example operational flow of an LHE method for providing circuit privacy according to one or more example embodiments.

The LHE method of one or more example embodiments may be performed on an electronic device serving as a receiver in an OLE protocol. In an example, the receiver may include a server (e.g., the server 120 of FIG. 1) that receives encrypted data from a user device and performs a homomorphic operation on the received data. At least one processor of the electronic device of the receiver may perform the LHE method illustrated in FIG. 2. A specific hardware configuration of the electronic device of the receiver is described below. The electronic device functioning as the receiver will be referred to as a receiver.

Referring to FIG. 2, the LHE method of one or more example embodiments may include the following steps: step 210 of receiving a homomorphic ciphertext of input data from a sender; step 220 of sampling a coefficient of a linear function from a first discrete Gaussian distribution corresponding to a coset of a plaintext modulus; step 230 of sampling a first noise from a predefined second discrete Gaussian distribution; and step 240 of generating a homomorphic ciphertext of an evaluation result resulting from evaluation performed on the input data from the linear function based on the sampled coefficient of the linear function and the sampled first noise.

In the following, the homomorphic ciphertext of the input data in step 210 is denoted as "c." The homomorphic ciphertext of the input data may be generated on an electronic device of the sender. In an example, the sender may include a client (e.g., the client 110 of FIG. 1). The electronic device of the sender will be simply referred to as a sender. The homomorphic ciphertext may be sent from the sender to the receiver by way of a data network, a cellular network, or the like.

According to one or more example embodiments, the homomorphic ciphertext of the input data may include a Brakerski/Fan-Vercauteren (BFV) ciphertext. More specifically, the homomorphic ciphertext of the input data may include a ciphertext generated by homomorphically encrypting the input data through a ring learning with errors (RLWE)-based BFV scheme.

According to one or more example embodiments, the homomorphic ciphertext of the input data may be generated by encrypting a result of a number-theoretic transform (NTT) operation corresponding to the plaintext modulus of the input data, based on a public key corresponding to a secret key of the sender and a second noise sampled from a third discrete Gaussian distribution. A secret key may be a decryption key corresponding to a public key, which is an encryption key used to encrypt input data. The secret key is also referred to as "s," and the public key is also referred to as "$p=(p_0, p_1)$." The second noise is denoted as "e" and may correspond to, for example, a three-dimensional (3D) vector $e=(e_0, e_1, e_2)$. In the following, the third discrete Gaussian distribution is denoted as $$D^3_{\mathbb{Z}^n,\rho},$$

the second noise is denoted as $$e \leftarrow D^3_{\mathbb{Z}^n,\rho},$$

the plaintext modulus of the input data is denoted as "t," and the result of the NTT operation corresponding to the plaintext modulus t of the input data is denoted as $x \in R_t$. A width parameter of the third discrete Gaussian distributor $$D^3_{\mathbb{Z}^n,\rho}$$

may correspond to ρ.

According to one or more example embodiments, step 210 of receiving the homomorphic ciphertext (e.g., via network) of the input data may further include receiving the public key corresponding to the homomorphic ciphertext of the input data. The receiver may receive, from the sender, the public key corresponding to the secret key used to generate the homomorphic ciphertext of the input data, along with the homomorphic ciphertext of the input data. The received public key may be used to encrypt the evaluation result (from evaluation on the input data from the linear function).

The linear function of one or more example embodiments may be defined based on a slope coefficient and a constant term coefficient on a polynomial ring and a residue ring for the plaintext modulus. The linear function may correspond to a function, $f(z)=az+b$, with the slope coefficient of "a" and the constant term coefficient of "b."

According to one or more example embodiments, the first discrete Gaussian distribution may include a discrete Gaussian distribution corresponding to a first width parameter in an integer lattice space of the coset of the plaintext modulus, which is an equivalence class of a modulo operation on the coefficient of the linear function and the plaintext modulus. The coset of the plaintext modulus for sampling the coefficient of the linear function may correspond to a set of the same values from the results of the module operation on original coefficients of the linear function and the plaintext modulus.

The coefficient of the linear function being sampled in step 220 may include the slope coefficient of the linear function. In the following, the coset of the plaintext modulus t for sampling the slope coefficient of the linear function $f(z)=az+b$ is denoted as $a+t\mathbb{Z}^n$. The first discrete Gaussian distribution is denoted as $D_{a+t\mathbb{Z}^n,\sigma}$. The width parameter of the first discrete Gaussian distribution may correspond to $\sigma>0$. The sampled coefficient of the linear function is denoted as $r \leftarrow D_{a+t\mathbb{Z}^n,\sigma}$.

According to one or more example embodiments, the second discrete Gaussian distribution for sampling the first noise in step 230 may include a discrete Gaussian distribution in an integer lattice space corresponding to a second width parameter. In the following, the second discrete Gaussian distribution is denoted as $$D^3_{\mathbb{Z}^n,\tau}.$$

The width parameter or the second discrete Gaussian distribution may correspond to $\tau>0$. The first noise is denoted as e', and the second noise may correspond to a 3D vector $e'=(e'_0, e'_1, e'_2)$, for example. The sampled first noise is denoted as $e' \leftarrow$ $$D^3_{\mathbb{Z}^n,\tau}.$$

According to one or more example embodiments, the first width parameter (of the first discrete Gaussian distribution) and the second width parameter (of the second discrete Gaussian distribution) may be determined based on a smoothing parameter of the integer lattice space of the coset and a stochastic maximum value of the third discrete Gaussian distribution in which the second noise corresponding to the homomorphic ciphertext of the input data is sampled. In an example, the first width parameter $\sigma$ and the second width parameter $\tau$ may be determined to satisfy Equation 25 with respect to the smoothing parameter $\eta_\epsilon(t\mathbb{Z}^n)$ of the integer lattice space of the coset and the stochastic maximum value $B_\rho$ of the third discrete Gaussian distribution $$D^3_{\mathbb{Z}^n,\rho}.$$

The values of the first width parameter $\sigma$ and the second width parameter $\tau$ are described below.

In the following, the homomorphic ciphertext of the evaluation result generated in step 240 is denoted as c'. According to one or more example embodiments, step 240 of generating the homomorphic ciphertext of the evaluation result may include encrypting a constant term of the linear function based on the public key corresponding to the homomorphic ciphertext of the input data, the first noise, and a ciphertext modulus, and adding the encrypted constant term of the linear function to a product of the sampled coefficient of the linear function and the homomorphic ciphertext of the input data to generate the homomorphic ciphertext of the evaluation result. The generating of the homomorphic ciphertext of the evaluation result are described below.

According to one or more example embodiments, a noise $r\cdot e+e'$ included in the homomorphic ciphertext c' of the evaluation result may follow a discrete Gaussian distribution independent of "a." Therefore, no information about "a" and "b" may leak from the homomorphic ciphertext c' of the evaluation result.

The LHE method of one or more example embodiments may include a step of transmitting (e.g., via a network, possibly as part of an exchange defined in an OLE protocol) the homomorphic ciphertext of the evaluation result to the sender. The sender may decrypt the homomorphic ciphertext of the evaluation result based on the secret key corresponding to the homomorphic ciphertext of the input data to acquire the evaluation result on the input data from the linear function. The homomorphic ciphertext of the evaluation result may be decrypted using the secret key held by the sender. The decrypted evaluation result may correspond to a result of evaluating the linear function of the input data in unencrypted form (i.e., cleartext).

The LHE method of one or more example embodiments may provide the sender with the evaluation result on the input data from the linear function, without an exposure of information (e.g., the constant term and/or coefficient) of the linear function. Further, the receiver may be able to compute the evaluation result on the input data from the linear function without any information about the input data. That is, the LHE method of one or more example embodiments may achieve OLE, which is described below.

The LHE method of one or more example embodiments may include an LHE method that provides circuit privacy by an RLWE-based BFV scheme. The LHE method may be based on an observation that a homomorphic operation algorithm may additionally randomize a coefficient of a linear function, in addition to a noise. The coefficient of the linear function in a plaintext space may correspond to elements in a ciphertext space, and a random element selected from the elements may be used to evaluate the linear function while maintaining the accuracy of a homomorphic operation. The LHE method may further include one more round of Gaussian sampling and one more round of encryption, compared to a typical BFV linear evaluation algorithm that does not provide circuit privacy. FHE bootstrapping or noise flooding may incur significant overhead in terms of space or time complexity. However, the LHE method may have an extremely small overhead with respect to the size of a parameter in concrete and asymptotic terms.

The LHE method of one or more example embodiments may be used in efficient OLE and/or MPC preprocessing protocols. For example, a semi-honest OLE protocol may be derived directly from the LHE method, and an OLE protocol that provides malicious security may be achieved by adding some proof-of-knowledge (PoK) techniques.

In addition, replacing an HE portion of the MPC protocol that generates authenticated triples with the LHE method may reduce an average communication cost by approximately 1.4 times, compared to a typical MPC protocol.

In the following, when two distributions $D_1$ and $D_2$ are defined on a countable domain $\Omega$, a statistical distance between $D_1$ and $D_2$ may be defined as $$\frac{1}{2}\sum_{\{x\in\Omega\}}|D_1(x)-D_2(x)|.$$

When a distribution D is defined on $\Omega$, sampling x from D is denoted as $x \leftarrow D$. In this case, if D is a uniform distribution on $\Omega$, sampling may be denoted by $x \leftarrow \Omega$. For two vectors u and v of the same size, a pointwise multiplication (e.g., Hadamard multiplication) is denoted as $u \odot v$.

$R:=Z[X]/(X^n+1)$ may be defined by a 2n-th cyclotomic ring, and $R_q:=Z_q[X]/(X^n+1)$ may be defined by a residue ring, which is an R modulo q (where q is an integer). Here, an element of R (or $R_q$), $$a=\sum_{i=0}^{n-1} a_i X^i,$$

may be equated with a vector $\dot{a}=(a_0, \ldots, a_{n-1})$ of its coefficient. In addition, $\|a\|_\infty$ denotes infinity norm of $\dot{a}$, and $\|a\|_1$ may denote $\ell_1$-norm. In addition, $$a=\sum_{i=0}^{n-1} a_i X^i \in R$$

may be equated with a negacyclic matrix A. The matrix A may be as expressed in Equation 1 below.

$$A = \begin{bmatrix} a_0 & -a_{n-1} & \cdots & -a_1 \\ a_1 & a_0 & \cdots & -a_2 \\ \vdots & \vdots & \ddots & \vdots \\ a_{n-1} & a_{n-2} & \cdots & a_0 \end{bmatrix} \quad \text{Equation 1}$$

For any a, b∈R, $\|ab\|_\infty \le \|a\|_\infty \|b\|_1 \le n\|a\|_\infty \|b\|_\infty$ holds. In addition, a vector representation of "ab" is denoted as $A\dot{b}$, which is a product of the negacyclic matrix A of "a" and a coefficient vector $\dot{b}$ of "b."

In the following, a coefficient vector $\dot{a}$ is denoted as "a," where a may be construed as a coefficient vector depending on the context. A vector $\dot{b}$ is denoted as "b," where b may be construed as a coefficient vector depending on the context.

For a symmetric real matrix $\Sigma \in \mathbb{R}^{n \times n}$ to be called positive-definite, it will satisfy $x^T \Sigma x > 0$ for all $0 \ne x \in \mathbb{R}^n$. Equivalently, a positive-definite matrix may be characterized in the form of $\Sigma = QD^2Q^T$ by spectral decomposition. Here, $Q \in \mathbb{R}^{n \times n}$ may be an orthogonal matrix (i.e., $Q^{-1} = Q^T$), and D may be a diagonal matrix with positive diagonal entries. Therefore, every positive-definite Σ may be invertible, and thus $\Sigma^{-1}$ may also be positive-definite.

A matrix $A \in {}^{n \times n}$ may be a square root of $\Sigma \in \mathbb{R}^{n \times n}$, i.e., if $A = \sqrt{\Sigma}$, then $AA^T = \Sigma$. When the choice of a specific square root is not important, it may be expressed as $\sqrt{\Sigma}$. By the spectral decomposition described above, every positive-definite matrix may have a square root.

For the matrix $A \in \mathbb{R}^{m, \times n}$, a matrix norm of A may be defined as expressed in Equation 2 below.

$$\|A\| = \sup_{0 \ne x \in \mathbb{R}^n} \frac{\|Ax\|_2}{\|x\|_2} \quad \text{Equation 2}$$

The largest and smallest singular values of the matrix A are denoted as $s_{max}(A)$ and $s_{min}(A)$, respectively. In addition, $\|A\| = s_{max}(A)$.

An n-dimensional Gaussian function $\rho: \mathbb{R}^n \to (0, 1]$ may be defined as expressed in Equation 3 below.

$$\rho(x) = \exp\left(-\pi \cdot \|x\|_2^2\right) \quad \text{Equation 3}$$

For a non-singular matrix $A \in \mathbb{R}^{n \times n}$ and a vector $\mu \in \mathbb{R}^n$, $\rho_{\mu,A}(x)$ may be defined as $\rho(A^{-1}(x-\mu))$. For the positive-definite matrix Σ, Equation 4 below holds.

$$\rho_{\mu,\sqrt{\Sigma}}(x) = \exp\left(-\pi(x-\mu)^T \sum\nolimits^{-1} (x-\mu)\right) \quad \text{Equation 4}$$

When μ=0, μ may be omitted but be denoted as $\rho_{\sqrt{\Sigma}}(x)$. If Σ is $\sigma^2 1$ for some σ>0, it may be denoted as $\rho_\sigma(x)$.

A lattice Λ may be a discrete additive subgroup of $\mathbb{R}^n$. A dual lattice of the lattice $\Lambda \subset \mathbb{R}^n$ may be defined as $\Lambda^* = \{v \in \mathbb{R}^n \mid \forall u \in \Lambda, \langle u, v \rangle \in \mathbb{Z}\}$. A discrete Gaussian distribution for Λ that is based on μ and having covariance Σ, with respect to the lattice $\Lambda \subset \mathbb{R}^n$, the vector $\mu \in \mathbb{R}^n$, and the positive-definite matrix $\Sigma \in \mathbb{R}^{n \times n}$, may be defined as in Equation 5 below.

$$D_{\Lambda,\mu,\sqrt{\Sigma}}(x) = \frac{\rho_{\mu,\sqrt{\Sigma}}(x)}{\rho_{\mu,\sqrt{\Sigma}}(\Lambda)} \quad \text{Equation 5}$$

If $\Sigma = \sigma^2 1$ for some σ>0, it may be simply denoted as $D_{\Lambda,\mu,\sigma}(x)$. When μ=0, μ may be omitted, but otherwise it may be denoted as $D_{\Lambda,\sqrt{\Sigma}}(x)$ or $D_{\Lambda,\sigma}(x)$.

For example, on a polynomial ring $R = \mathbb{Z}[X]/(X^n+1)$ and a residue ring $R_\tau := \mathbb{Z}_t[X]/(X^n+1)$ for a plain modulus t, assume that a linear function, f(z)=az+b, for a, $b \in R_t$, is given, and a BFV ciphertext $$c := Enc(x, e) \in R_q^2$$

for input data $x \in R_t$ and encryption randomness $e \in R^3$ is given. "c" may correspond to a ciphertext of the input data received in step 110.

In BFV, a method of evaluating a linear function "f" in a typical homomorphic manner may involve computing $c' = r \cdot c + (\Delta b, 0) \pmod q$, where $r = [a]_t R$, and $\Delta = q/t \in \mathbb{Z}\mathbb{Z}$. However, this method may not guarantee circuit privacy, because a second component of c' may fully expose information about $r = [a]_t$, and thus b may also be fully recovered. To achieve circuit privacy, previous research has adopted a method of adding encryption of zeros (0) with exponentially large randomness e' to a resulting ciphertext c', i.e., noise flooding. This noise flooding method may statistically obliterate the information about "a" and "b." The noise flooding method, however, may incur an exponentially large ciphertext modulus, greatly increasing the computational and communication costs.

The LHE method of one or more example embodiments may be based on the following observations: (i) r may not necessarily be $[a]_t$, and may be any element in a coset of $a + t'\mathbb{Z}^n$ to ensure correctness of a homomorphic operation, and (ii) a sum of two discrete Gaussian distributions for the coset $a + t\mathbb{Z}$ and $\mathbb{Z}^n$ with an appropriate width parameter may be statistically approximate to a discrete Gaussian distribution on $\mathbb{Z}^n$, which may be independent of "a" in particular.

The LHE method based on these observations may include the following steps. First, for width parameters σ, τ>0, r and e' may be sampled from discrete Gaussian distributions D $D_{a+t\mathbb{Z}^n, 94}$ and $$D^3_{\mathbb{Z}^n, \tau},$$

respectively. Subsequently, the ciphertext c' may be computed as expressed in Equation 6 below.

$$c' := r \cdot c + Enc(b, e') \pmod q \quad \text{Equation 6}$$

The LHE method may compute essentially the same equation as one used by the typical method, but may significantly reduce the size of e' due to a difference in the sampling procedure for "r." Technically, by setting σ=0(t) and $\tau = 0(\sigma n \|e\|_\infty)$, a distribution of a convolved error term r·e+e' of c' may become statistically indistinguishable from the discrete Gaussian distribution $D_{\mathbb{Z}^{3n}, k, \sqrt{\Sigma}}$ where both κ and Σ are independent of "." This is described with reference to Theorem 1 below. This suggests that the LHE method provides circuit privacy. This is because c'=r·Enc(x, e)+Enc (b, e')=Enc(ax+b,r·e+e') (mod q), and only information in c' that depends on "a" and "b" is a resulting message ax+b.

According to Lemma 10, described below, comparing the correctness condition of the LHE method and the typical encryption method of c'=r·c+(Δb, 0) (mod q) where $r=[a]_t$ with no circuit privacy, it may be verified that the number of bits additionally required in the ciphertext modulus q for the width parameters σ=O(t) and $\tau=0(\sigma n\,\|e\|_\infty)$ may only be $\tilde{O}_\lambda(1)$. Therefore, the LHE method may provide circuit privacy at almost no additional cost, compared to the typical encryption method without circuit privacy.

The LHE method of one or more example embodiments may be applied to OLE and/or MPC preprocessing.

In an example, a semi-honest OLE protocol may be derived directly from the LHE method that provides circuit privacy. To achieve active security against a malicious sender and receiver in an OLE protocol, some Pok protocols may be adopted such that both the sender and the receiver may guarantee that the other party's information is included in a proved language. More specifically, the receiver may first send a ciphertext c of a plaintext x through a PoK protocol for plaintext knowledge. The Pok protocol (or a protocol encompassing PoK functionality) for the plaintext knowledge may be secure under the hardness assumption of RLWE. In the evaluation phase, the sender may send a ciphertext c' acquired through the LHE method for a linear function f(z)=az+b, through a Pok protocol for knowledge of coefficients a and b. Dissimilar to the Pok protocol for the plaintext knowledge, the Pok protocol for the knowledge of a and b may not require any computational difficulty assumptions. This is described with reference to Lemma 14 below.

For MPC preprocessing, a LowGear protocol may be implemented by LHE that provides circuit privacy and a corresponding zero-knowledge proof of plaintext knowledge (ZKPoPK) protocol. While the typical LowGear protocol may use noise flooding for circuit privacy, applying the LHE method to the LowGear protocol may achieve better performance.

Following is description of preliminary definitions, theorems, lemmas, and corollaries that prefaces the later detailed description of the LHE method of one or more example embodiments and its effects.

Discrete Gaussians on Lattices

Definition1 (Smoothing Parameter)

For an n-dimensional lattice Λ and a positive real number ϵ>0, a smoothing parameter $\Lambda_\epsilon(\Lambda)$ may be the smallest s that satisfies $\rho_{1/s}(\Lambda^*\backslash\{0\})\leq\epsilon$.

Lemma 1

For any $c\in\mathbb{R}$, any ϵ>0, $\sigma\geq\eta_\epsilon(\mathbb{Z})$, and any κ>0, the inequality in Equation 7 below holds.

$$\Pr_{x\leftarrow D_{c+\mathbb{Z},\sigma}}[|x-c|\geq\kappa\cdot\sigma]\leq 2e^{-\pi\kappa^2}\cdot\frac{1+\epsilon}{1-\epsilon}\qquad\text{Equation 7}$$

The following lemma states that a full Gaussian measure of a coset of a given lattice is essentially the same when it has a sufficiently large covariance with respect to the smoothing parameter.

Lemma 2 (Simplified Convolution Lemma)

Assume that, for any real number $\sigma_1, \sigma_2>0$, $\sigma_3^{-2}:=\sigma_1^{-2}+\sigma_2^{-2}$ satisfies $\sigma_3\geq\eta_\epsilon(\mathbb{Z}^n)$ for some 0<ϵ<1/2. Then, for any $c\in\mathbb{Z}^n$, a distribution in Equation 8 below is within a statistical distance 2ϵ from $D_{\mathbb{Z}^n,c,\sqrt{(\sigma_1^2+\sigma_2^2)}}$.

$$\{x_1+x_2\mid x_1\leftarrow\mathcal{D}_{\mathbb{Z}^n,\sigma_1},\ x_2\leftarrow\mathcal{D}_{\mathbb{Z}^n,c,\sigma_2}\}\qquad\text{Equation 8}$$

Lemma 3

Assume that Λ is a full-rank n-dimensional lattice. For any real number ϵ∈ (0, 1), vector $c\in\mathbb{R}^n$, and non-singular matrix $A\in\mathbb{R}^{n\times n}$ that satisfies $s_{min}(A)\geq\eta_\epsilon(\Lambda)$, Equation 9 below holds.

$$\rho_A(\Lambda+c)\in\left[\frac{1-\epsilon}{1+\epsilon},1\right]\cdot\rho_A(\Lambda)\qquad\text{Equation 9}$$

Lastly, a useful boundary for the smoothing parameter will be described.

Lemma 4

For any n-dimensional lattice Λ and ϵ>0, Equation 10 below holds.

$$\eta_\epsilon(\Lambda)\leq\sqrt{\frac{\ln(2n(1+1/\epsilon))}{\pi}}\cdot\lambda_n(\Lambda)\qquad\text{Equation 10}$$

In Equation 10, $\lambda_n(\Lambda)$ denotes an n-th successive minimum of Λ. In other words, $\lambda_n(\Lambda)$ may be the smallest real number r>0 that satisfies dim(span(Λ∩rB))=n, where B is an n-dimensional unit ball centered at the origin.

The following is a direct corollary of Lemma 4.

Corollary 1

For any t>0 and E>0, the inequality in Equation 11 below holds.

$$\eta_\epsilon(t\mathbb{Z}^n)\leq t\cdot\sqrt{\frac{\ln(2n(1+1/\epsilon))}{\pi}}\qquad\text{Equation 11}$$

FIG. 3 illustrates an example of a secret key generation function 300 according to one or more example embodiments.

According to one or more example embodiments, a secret key "s" may be generated by $F_{KeyGen}$, which is a KeyGen functionality illustrated in FIG. 3.

Definition 2

Assume that n is a power of 2, q>0 is an integer, and ρ>0 is a real number. An RLWE distribution for parameters (n, q, ρ) and the secret key (secret) s∈R may be a distribution of $R^2_q$ that is acquired by sampling $a\leftarrow R_q$, sampling $e\leftarrow D_{\mathbb{Z}^n,\rho}$, and then returning (b, a) where b=as+e (mod q). When a secret key distribution χ is selected from R, a decisional RLWE problem, which is expressed as RLWE(n, q, ρ, χ), may be to distinguish the RLWE distribution acquired by sampling the secret s←χ from a uniform distribution of $R^2_q$.

In the following, assume that the secret key is selected from a ternary distribution, which means that each coefficient of the secret key is selected from {−1, 0, 1}. When χ is a discrete Gaussian distribution with a width parameter σ, the RLWE problem may be simply expressed as RLWE(n, q, ρ, σ).

FIG. 4 illustrates an example of an OLE functionality 400 according to one or more example embodiments.

Referring to the OLE functionality 400, $F_{OLE}$, illustrated in FIG. 4, OLE is a secure computation protocol of a linear function between two parties, i.e., a receiver and a sender. Standard OLE for a field F proceeds in the following way: given a, b∈F held by the sender, the sender securely computes ax+b and sends a result thereof to the receiver having x∈F.

For example, there are two extensions to the typical OLE protocol, which are batch OLE (BOLE) and vector OLE (VOLE). In BOLE, for any $a_i$, $b_i \in F$ held by the sender and $x_i \in F$ held by the receiver, when $1 \le i \le n$, the receiver may learn a set of multiple values of $a_i \cdot x_i + b_i$. In other words, BOLE may allow the receiver to perform OLE multiple times with a single protocol. In VOLE, the receiver may learn a vector ax+b when a, $b \in F^n$ and $x \in F$ for vectors a and b. VOLE may be considered a special case of the BOLE protocol, where the receiver sends only a single input x.

More generally, the standard OLE functionality may be extended based on a (finite) ring, which is referred to as ring-OLE. In this case, there is a focus on a ring-OLE protocol on a residue ring $R_t$ that allows parallel processing of VOLE and BOLE to be performed. In this case, a ring dimension "n" and a plaintext modulus "t" need to satisfy the condition $2n|t-1$.

Figure 5:
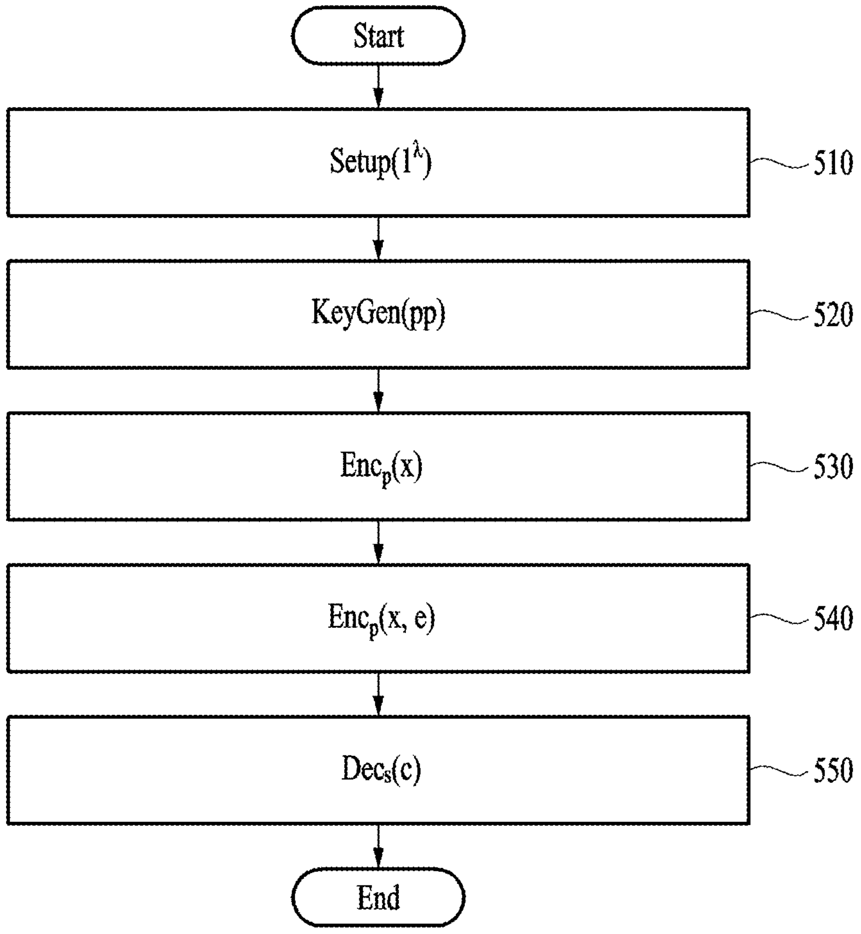
FIG. 5 illustrates an example of a ring learning with errors (RLWE)-based Brakerski/Fan-Vercauteren (BFV) encryption scheme according to one or more example embodiments.

FIG. 5 illustrates an example of an RLWE-based BFV encryption scheme according to one or more example embodiments.

Referring to FIG. 5, an RLWE-based BFV encryption scheme may include Setup $(1^\lambda)$ step 510, KeyGen (pp) step 520, $Enc_p(x)$ step 530, $Enc_p(x, e)$ step 540, and $Dec_s(c)$ step 550.

The Setup $(1^\lambda)$ step 510 may include selecting, given a security parameter λ, an integer n that is a power of 2, a ciphertext modulus q, a plaintext modulus t, an error parameter ρ>0, and a key distribution χ in R, and returning a public parameter pp=(n, q, t, ρ, χ).

The KeyGen (pp) step 520 may include sampling a secret key $s \leftarrow \chi$, sampling $p_1 \leftarrow R_q$ and $e_p \leftarrow D_{\mathbb{Z}^n,\rho}$, and setting the public key to $p=(p_0, p_1)$ where $p_0=-p_1 \cdot s+e_p \pmod q$.

The $Enc_p(x)$ step 530 may include, for a message $x \in R_t$, sampling $e \leftarrow$ $$D^3_{\mathbb{Z}^n,\rho}$$

and returning $c=Enc_p(x, e)$.

The $Enc_p(x, e)$ step 540 may include returning $c=e_2 \cdot p+(\Delta \cdot x+e_0, e_1) \pmod q$ for the message $x \in R_t$ and encryption randomness $e=(e_0, e_1, e_2) \in R^3$.

The $Dec_s(c)$ step 550 may include returning $\lfloor (c_0+c_1 \cdot s)/\Delta \rceil \pmod t$ for $c=(c_0, c_1)$.

In the following, it is assumed that the plaintext modulus t divides the ciphertext modulus q. This assumption simplifies the construction and security analysis of algorithms and protocols. In addition, Δ=q/t is denoted as a scaling factor.

BFV encryption is semantically secure. That is, under the RLWE assumption of a parameter (n, p, ρ, χ), $Enc_p(x)$ is indistinguishable from a uniform random variable of $R^2_q$. Further, a new BFV ciphertext $c=(c_0, c_1) \in R^2_q$ satisfies Equation 12 below.

$$c_0+c_1 s = e_2 \cdot (p_0+p_1 s) + (\Delta \cdot x + e_0 + e_1 s) = \Delta \cdot x + e \pmod q \quad \text{Equation 12}$$

In Equation 12, $e=e_0+e_1 \cdot s+e_2 \cdot e_p$ denotes an encryption error (or noise).

A linear evaluation algorithm for the BFV scheme is described below. Given an affine function f(z)=az+b defined over $R_t$ and a BFV ciphertext c for $x \in R_t$, a ciphertext $y=f(x) \in R_t$ may be acquired by homomorphically evaluating f. Since coefficients a, $b \in R_t$ cannot be used directly in a computation of $R_q$, f may not be evaluated homomorphically by computing only f over the input ciphertext $c \in R^2_q$. Therefore, the coefficients on $R_t$ are embedded as elements of R and $R_q$ through $a \rightarrow r:=[a]_t \in R$ and $b \rightarrow \Delta \cdot b \in R_q$.

The linear evaluation algorithm may be described as LinEval(c; a, b). LinEval(c; a, b) may include setting $r=[a]_t \in R$, given the ciphertext $c \in R^2_q$ and the coefficients a, $b \in R$, and outputting $c'=r \cdot c+(\Delta b, 0) \pmod q$.

The correctness of the linear evaluation algorithm may be proved as follows. If $c=Enc_p(x, e)$ is a BFV ciphertext for $x \in R_t$ and $e \in R^3$, and a and b are elements of $R_t$ where $r:=[a]_t$, then Equation 13 below may be acquired.

$$c' = r \cdot c + (\Delta b, 0) = Enc_p(y, re) \pmod q \quad \text{Equation 13}$$

In Equation 13, $y=rx+b=ax+b \in R_t$.

It is possible to homomorphically evaluate an arbitrary affine function f(x)=ax+b using the BFV scheme. However, a basic linear evaluation algorithm does not guarantee circuit privacy of "f." To be precise, for the ciphertext $c=(c_0, c_1) \in R^2_q$ and a, $b \in R_t$, the linear evaluation algorithm returns $c'=(c'_0, c'_1) \leftarrow$ LinEval(c; a, b) that satisfies $c'_1=rc_1 \pmod q$ with respect to $r=[a]_t$. Therefore, from an input and output ciphertext pair, a, $b \in R_t$ may be recovered by computing $a=c_1^{-1} \cdot c'_1 \pmod t$ and $b=\Delta^{-1} \cdot (c'-[a]_t \cdot c) \pmod t$. Similarly, if $c_0+c_1 s=\Delta \cdot x+e \pmod q$, then r (and hence $a=r \pmod t$) may be recovered by using an error term of the two ciphertexts, $$c'_0 + c'_1 s = \Delta \cdot y + e' \pmod q, \text{ for } e' = re \in R.$$

In a case where the leakage of information on an evaluation circuit from an output ciphertext is negligible, such a linear evaluation algorithm is circuit-private. Circuit privacy may be defined as follows.

Definition 3

An LHE scheme (Setup, KeyGen, Enc, Dec, Eval) may provide circuit privacy for a linear circuit, when a PPT algorithm A, such as any $x \in R_t$, a, $b \in R_t$, and Equation 14 below, is negligibly small, if $pp \leftarrow$ Setup $(1^\lambda)$, $(sk, pk) \leftarrow$ KeyGen(pp), $c \leftarrow$ Encpk(x), and $y=ax+b \in R_t$, and there is a PPT simulator algorithm Sim (simulator).

$$|Pr[\mathcal{A}(Eval_{pk}(c; a, b), c, sk, pk)] - Pr[\mathcal{A}(Sim(sk, pk, c, y), c, sk, pk = 1]| \quad \text{Equation 14}$$

To achieve circuit privacy, a noise flooding method has typically been used. The noise flooding method may randomize a ciphertext so that an initial noise is overwhelmed by a newly introduced noise by adding a zero (0) ciphertext with a noise from a wide distribution. Specifically, a circuit-private version of the linear evaluation algorithm may be acquired by modifying it to $c'=$LinEval(c; a, b)$+Enc_p(0, e')$, where e' is sampled from a discrete Gaussian distribution with exponentially large width.

While using the noise flooding method achieves circuit privacy, the noise flooding method may introduce significant overhead because a ciphertext modulus q needs to be exponentially large to support the correct decryption of a resulting ciphertext c', which may affect both computational and communication costs.

The LHE method of one or more example embodiments may achieve circuit privacy with much smaller overhead compared to the noise flooding method. First, assume that an output ciphertext generated by the noise flooding method is expressed as Equation 15 below.

$$c' = LinEval(c; a, b) + Enc_p(0, e') = Enc_p(y, \tilde{e})\ )\ (\text{mod } q) \quad \text{Equation 15}$$

Here, $r=[a]_t$ and, $\tilde{e}=r\cdot e+e' \in R$. As a result, the noise flooding method may be inevitable to statistically obliterate the information of $r\cdot e$.

The LHE method of one or example embodiments is based on an observation that there is room for additional randomization in the linear evaluation algorithm. By embedding an element of $r \in R$ before multiplying a coefficient "a" of a linear function by "c," an arbitrarily small element of R computed as "a (mod t)" may be selected, instead of r being set exactly to $[a]_t$. If r is reasonably small, the correctness of linear evaluation may be still preserved, because a plaintext space is $R_t$. Based on this, the LHE method of one or example embodiments may include a novel randomized linear evaluation algorithm using r sampled from a discrete Gaussian distribution on a coset $a+t\mathbb{Z}^n$. The coset $a+t\mathbb{Z}^n$ is a set of elements of $r \in R$ where r=a (mod t).

The randomized linear evaluation algorithm may be described as $RandLinEval_p(c; a, b)$. $RandLinEval_p(c; a, b)$ may include sampling $r \leftarrow D_{a+t\mathbb{Z}^n,\sigma}$ and $e' \leftarrow$ $$D^3_{\mathbb{Z}^n,\tau},$$

given a ciphertext $c \in R^2_q$ and ring elements a, $b \in R_t$, and computing and outputting $c' := r\cdot c + Enc_p(b, e')$ (mod q).

The randomized linear evaluation algorithm may enable the use of much smaller (asymmetrically optimized) parameters, compared to the typical linear evaluation algorithm, and may therefore achieve significant performance improvement.

The following will describe how parameters $\sigma, \tau>0$ of a discrete Gaussian distribution are selected to satisfy the correctness and security requirements.

Assume that $B_\rho$, $B_\sigma$, and $B_\tau$ are essential upper limits of distributions $D_{\mathbb{Z}^n,\rho}$, $D_{a+t\mathbb{Z}^n,\sigma}$, and $D_{\mathbb{Z}^n,\tau}$, respectively, where "a" is an arbitrary element of $R_t$. In other words, samples extracted from the respective distributions are bounded by the corresponding upper limits with overwhelming probability. These upper limits may be acquired explicitly from Lemma 1.

Lemma 5 (Correctness)

Assume $c \leftarrow Enc_p(x)$ for some $x \in R_t$. Then, the randomized linear evaluation algorithm, RandLinEval(c; a, b), may output a BFV encryption of f(x)=ax+b when it satisfies Equation 16 below.

$$(nB_\rho B_\sigma + B_\tau)(1 + n \rightarrow nB_\rho) < \Delta/2 \quad \text{Equation 16}$$

Proof. By definition, for $e \leftarrow$ $$D^3_{\mathbb{Z}^n,\rho},\ r \leftarrow D_{a+t\mathbb{Z}^n,\sigma},$$

and $e' \leftarrow$ $$D^3_{\mathbb{Z}^n,\tau},\ c = Enc_p(x, e)$$

and $c' = r\cdot Enc_p(x, e)+Enc_p(b, e')=Enc_p(y, r\cdot e+e')$ (mod q).

Assume $\tilde{e}=(\tilde{e}_0, \tilde{e}_1, \tilde{e}_2)=r\cdot e+e'$. In this case, the output ciphertext $$c' = (c'_0, c'_1)$$

is equal to $Enc_p(y, \tilde{e})$ and satisfies $c'_0+c'_1 s=\Delta y+e^*$ (mod q), where $e^*=\tilde{e}_0+\tilde{e}_1 s+\tilde{e}_2 e_p$. A key s is sampled from a ternary distribution, and each coefficient of $\tilde{e}$ is bounded by $n\cdot B_\rho B_\sigma + B_\tau$. Therefore, $\|e^*\|_\infty \le (nB_\rho B_\sigma+B_\tau)(1+n+nB_\rho)<\Delta/2$, and the resulting ciphertext c' is correctly decrypted to be y=ax+b.

The following describes how the randomized linear evaluation algorithm achieves circuit privacy. First, some useful lemmas for analyzing a distribution of encryption randomness are described.

Lemma 6

Assume that, for some $0<\epsilon\le 1/2$, $t>0$ is an integer, $E \in \mathbb{Z}^{m\times n}$ is a matrix, and $\sigma, \tau>0$ are real numbers that satisfy Equation 17 below.

$$\frac{1}{\sigma^2} + \frac{1}{\tau^2}\|E\|^2 \le \frac{1}{\eta_\epsilon(t\mathbb{Z}^n)^2} \quad \text{Equation 17}$$

Then, for any a, $\mu \in \mathbb{R}^n$ and $v \in \mathbb{R}^m$, a distribution of Equation 18 below on $\mathbb{Z}^m$ is within a statistical distance $4\epsilon$ from $D_{\mathbb{Z}^m,\kappa,\sqrt{\Sigma}}$ where $\kappa=E\mu+v$ and $\Sigma=\sigma^2\cdot EE^T+\tau^2\cdot I_m$.

$$\mathcal{D} := \{Er + e' : r \leftarrow D_{a+t\mathbb{Z}^n,\mu,\sigma},\ e' \leftarrow D_{\mathbb{Z}^m,v,\tau}\} \quad \text{Equation 18}$$

Proof. For any $x \in \mathbb{Z}^m$, a probability that D outputs x may be expressed as Equation 19 below.

$$\begin{aligned}\mathcal{D}(x) &= Pr\left[Er + e' = x \mid r \leftarrow D_{a+t\mathbb{Z}^n,\mu,\sigma},\ e' \leftarrow D_{\mathbb{Z}^m,v,\tau}\right] \\ &= \sum_{y\in a+t\mathbb{Z}^n} D_{a+t\mathbb{Z}^n,\mu,\sigma}(y)\cdot D_{\mathbb{Z}^m,v,\tau}(x - Ey) \\ &\propto \sum_{y\in a+t\mathbb{Z}^n} \rho_\sigma(y-\mu)\cdot\rho_\tau(x - v - Ey) \\ &= \sum_{y\in a-\mu+t\mathbb{Z}^n} \exp\left[-\pi\left(\frac{1}{\sigma^2}\|y\|^2 + \frac{1}{\tau^2}\|(x-\kappa)-Ey\|^2\right)\right]\end{aligned} \quad \text{Equation 19}$$

According to Equation 19, Equation 20 below holds.

$$\begin{aligned}&\frac{1}{\sigma^2}\|y\|^2 + \frac{1}{\tau^2}\|(x-\kappa)-Ey\|^2 = \\ &y^T\sum\nolimits_1^{-1} y - \frac{1}{\tau^2}\left(y^T E^T(x-\kappa) + (x-\kappa)^T Ey\right) + \frac{1}{\tau^2}(x-\kappa)^T(x-\kappa) = \\ &\left(y - \frac{1}{\tau^2}\sum\nolimits_1 E^T(x-\kappa)\right)^T \sum\nolimits_1^{-1}\left(y - \frac{1}{\tau^2}\sum\nolimits_1 E^T(x-\kappa)\right) + \\ &(x-\kappa)^T\sum\nolimits^{-1}(x-\kappa)\end{aligned} \quad \text{Equation 20}$$

In Equation 20, $$\sum\nolimits_1^{-1} := \frac{1}{\sigma^2} I_n + \frac{1}{\tau^2} E^{\mathrm{T}} E.$$

This implies Equation 21 below.

$$\sum_{y \in a-\mu+t\mathbb{Z}^n} \rho_{\sqrt{\Sigma_1}}\left(y - \frac{1}{\tau^2} \sum\nolimits_1 E^{\mathrm{T}}(x-\kappa)\right) \cdot \rho_{\sqrt{\Sigma}}(x-\kappa) = \rho_{\sqrt{\Sigma_1}}\left(a - \mu - \frac{1}{\tau^2} \sum\nolimits_1 E^{\mathrm{T}}(x-\kappa) + t\mathbb{Z}^n\right) \cdot$$
$$\rho_{\sqrt{\Sigma}}(x-\kappa) \in \left[\frac{1-\epsilon}{1+\epsilon}, 1\right] \cdot \rho_{\sqrt{\Sigma_1}}(t\mathbb{Z}^n) \cdot$$
$$\rho_{\sqrt{\Sigma}}(x-\kappa) \propto \left[\frac{1-\epsilon}{1+\epsilon}, 1\right] \cdot D_{\mathbb{Z}^m,\kappa,\sqrt{\Sigma}}(x) \quad \text{Equation 21}$$

In Equation 21, the last inclusion may be derived from Lemma 3 and the conditions in Equation 22 below.

$$s_{min}\left(\sqrt{\sum\nolimits_1}\right) = \frac{1}{\left\|\sum\nolimits_1^{-1}\right\|} \geq \frac{1}{\sqrt{\frac{1}{\sigma^2} + \frac{1}{\tau^2}\|E\|^2}} \geq \eta_\epsilon(t\mathbb{Z}^n). \quad \text{Equation 22}$$

As a result, Equation 23 below is acquired, and it may be concluded that the statistical distance between D and D $D_{a+t\mathbb{Z}^{n\,m},\kappa,\sqrt{\Sigma}}$ is bounded by 4ϵ.

$$\mathcal{D}(x) \in \left[\frac{1-\epsilon}{1+\epsilon}, \frac{1+\epsilon}{1-\epsilon}\right]. \quad \text{Equation 23}$$
$$D_{\mathbb{Z}^m,\kappa,\sqrt{\Sigma}}(x) \subseteq [1-4\epsilon, 1+4\epsilon] \cdot D_{\mathbb{Z}^m,\kappa,\sqrt{\Sigma}}(x)$$

Corollary 2

Assume that $e=(e_0, e_1, e_2)$ is an element of $R^3$ that satisfies $\|e\|_\infty \leq B_\rho$. For any $0<\epsilon\leq 1/2$, when Equation 24 below is satisfied, a distribution of $\tilde{e}=r\cdot e+e'$ on $R^3$ defined by $r \leftarrow D_{a+t\mathbb{Z}^n,\mu,\sigma}$ and $e' \leftarrow D_{Z^{3n},v,\tau}$ with respect to any $\mu \in R$ and $v \in R^3$ may be within a statistical distance 4ϵ from $D_{Z^{3n},\kappa,\sqrt{\Sigma}}$ for $\kappa=\mu\cdot e+v$ and $\Sigma=\sigma^2\cdot EE^T+\tau^2\cdot I_{3n}$. Here, $E_i \in \mathbb{Z}^{n\times n}$ denotes a negacyclic matrix corresponding to $e_i$ for i=0, 1, and 2, and $$E = \begin{bmatrix} E_0 \\ E_1 \\ E_2 \end{bmatrix} \in \mathbb{Z}^{3n\times n}.$$

$$\frac{1}{\sigma^2} + \frac{3n^2 B_\rho^2}{\tau^2} \leq \frac{1}{\eta_\epsilon(t\mathbb{Z}^n)^2} \quad \text{Equation 24}$$

Proof. When ṙ is a coefficient vector of r, a coefficient representation of $r\cdot e_i$ is denoted as $E_i\cdot\dot{r}$. Therefore, Corollary 2 may be derived directly from Lemma 6 and the fact that $\|E\|^2 \leq 3n^2 B^2_\rho$. In the following, the coefficient vector ṙ is denoted as r, where r may be construed as a coefficient vector depending on the context.

Theorem 1 (Linear Circuit Privacy)

The BFV scheme, together with the randomized linear evaluation algorithm RandLinEval(c; a, b), under parameters σ and τ, is circuit-private for all affine functions over $R_t$ when Equation 24 holds for some negligible ϵ>0.

Proof. Assume that $c=Enc_p(x, e)$ is an encryption of $x \in R_t$ for some e←

$$D^3_{\mathbb{Z}^n,\rho}.$$

Assume that f(z)=az+b is an affine function on $R_t$ for some coefficients $a, b \in R_t$, and assume that $y=ax+b \in R_t$. A simulator Sim for an output ciphertext c' of the randomized linear evaluation algorithm is defined by $\mathrm{RandLinEval}_p(c; 0, y)$ as expressed in Equation 25 below.

$$\mathrm{Sim}(s, p, c, y) = \left\{c' = r\cdot c + Enc_p(y, e') \in R_q^2 : r \leftarrow D_{t\mathbb{Z}^n,\sigma},\ e' \leftarrow D^3_{\mathbb{Z}^n,\mathcal{T}}\right\} \quad \text{Equation 25}$$

The following will describe statical indistinguishability between c' and Sim(s, p, c, y) in RandLinEval(c; a, b) using a hybrid argument.

Assume a distribution in Equation 26 below.

$$\mathcal{H} := \left\{c' = Enc_p(y, \tilde{e}) : \tilde{e} = (\tilde{e}_0, \tilde{e}_1, \tilde{e}_2) \leftarrow D_{\mathbb{Z}^{3n},\sqrt{\Sigma}}\right\} \quad \text{Equation 26}$$

Here, $\Sigma=\sigma^2\cdot EE^T+\tau^2\cdot I_{3n}$ and, $E_i$ is a negacyclic matrix corresponding to $e_i$ for i=0, 1, and 2, and $$E = \begin{bmatrix} E_0 \\ E_1 \\ E_2 \end{bmatrix} \in \mathbb{Z}^{3n\times n}.$$

Argument 1. For arbitrary a and b, real algorithms RandLinEval and H are statistically indistinguishable. As shown in the proof of Lemma 5, the output ciphertext of $\mathrm{RandLinEval}_p(c; a, b)$ may be expressed as $c'=Enc_p(y, \tilde{e})$ for any $r \in R$ sampled from $D_{a+t\mathbb{Z}^n,\sigma}$ and $\tilde{e}=re+e'$. Therefore, the distribution of RandLinEval(c; a, b) is within a statistical distance 4ϵ from the distribution of H by Corollary 2.

Argument 2. H and Sim(s, p, c, y) are also statistically indistinguishable. This may be proved using the same argument as above since Sim(s, p, c, y) is simply a special case of RandLinEval_p(c; a, b) where a=0 and b=y. Therefore, the statistical distance between H and Sim(s, p, c, y) is bounded by 4ϵ.

By combining Argument 1 and Argument 2, it may be concluded that $\mathrm{RandLinEval}_p(c; a, b)$ and Sim(s, p, c, y) are within a negligible statistical distance ≤8ϵ.

It is worth noting that the secret key s need not be used to construct a simulator in Theorem 1. Further, while the hybrid game H relies on the fact that c can be written in the form $Enc_p(x, e)$ and that the randomness e is used to set the covariance matrix Σ, the simulator may be defined without this information.

To discuss the optimality of the randomized linear evaluation algorithm from Theorem 1, the main conditions for parameter selection given in Equation 24 may need to be considered.

The error parameter may be selected such that σ and $T\tau/\|E\|$ have a small bit size relative to the smoothing parameter $\eta(t\mathbb{Z}^n)$. For example, referring to a table 600 shown in FIG. 6, values of $\sigma$ and $\tau/\|E\|$ in a parameter set may be limited to 8t. As a result, random variables $r \leftarrow D_{a+t\mathbb{Z}^n,\sigma}$ and $e' \leftarrow$ $$D^3_{\mathbb{Z}^n,\tau}$$

in a real algonum may exniun comparable sizes to a and t·e with only a $\tilde{O}_\lambda(1)$ bit difference. Now consider the assumption that a final noise of RandLinEval, r·e+e', has an asymptotic size of a·e, which corresponds to the final noise of LinEval, i.e., linear evaluation without noise flooding. As a result, the randomized linear evaluation algorithm may effectively manage parameters with asymptotically optimal sizes that differ by only a few bits, compared to the optimal case.

FIG. 7 illustrates an example of a semi-honest OLE protocol 700 to which an LHE method is applied according to one or more example embodiments.

Referring to FIG. 7, phases of an OLE protocol of a semi-honest model $$\prod_{OLE}^{passive}$$

are illustrated.

Lemma 7 (Correctness)

Assume that both the receiver and the sender behave honestly, then the protocol $$\prod_{OLE}^{passive}$$

correctly computes the OLE functionality $F_{OLE}$ illustrated in FIG. 4 with an overwhelming probability when $(nB_\rho B_\sigma + B_\tau)(1+n+nB_\rho) < \Delta/2$.

Proof. The proof of Lemma 7 follows directly from Lemma 5.

It is proved that $$\prod_{OLE}^{passive}$$

in FIG. 7 securely computes the $F_{OLE}$ in FIG. 4 in the presence of a static passive adversary.

Lemma 8 (Security Against Sender)

If the basic BFV encryption scheme is semantically secure, then the protocol $$\prod_{OLE}^{passive}$$

satisfies receiver privacy against an honest-but-curious sender.

Proof. Define $S_{Receiver}$ as a simulator that outputs a ciphertext $c = Enc_p(0, e)$ with $e \leftarrow$ $$D^3_{\mathbb{Z}^n,\rho}$$

independently of an input x of the receiver. Since the BFV encryption scheme is IND-CPA secure under the RLWE assumption on a parameter (n, q, ρ), the simulated view at $S_{Receiver}$ is computationally indistinguishable from a view of the sender under the real protocol $$\prod_{OLE}^{passive}.$$

Lemma 9 (Security Against Receiver)

If Equation 27 below holds for some negligible $\epsilon > 0$, then the protocol $$\prod_{OLE}^{passive}$$

is secure against an honest-but-curious receiver.

$$\frac{1}{\sigma^2} + \frac{3n^2B_\rho^2}{\tau^2} \leq \frac{1}{\eta_\epsilon(t\mathbb{Z}^n)^2} \qquad \text{Equation 27}$$

Proof. To show security for the receiver, it suffices to show that the ciphertext c' is available for simulation. The proof follows directly from Theorem 1.

Theorem 2

If the conditions of Lemmas 7, 8, and 9 hold, then the protocol securely $$\prod_{OLE}^{passive}$$

securely realizes the functionality, $F_{OLE}$, in the presence of a static passive adversary in a $F_{KeyGen}$-hybrid model.

As described above, the randomized linear evaluation algorithm of one or more example embodiments may achieve asymptotic optimality with respect to the error parameter, which may be extended to the OLE protocol. Therefore, the scheme of the LHE method of one or more example embodiments may use a small ciphertext modulus that only needs to accommodate optimally sized noise, resulting in low communication costs. In addition, the table in FIG. 6 shows a set of parameters corresponding to plaintext moduli of 16, 32, 64, 80, and 128 bits for the semi-honest OLE protocol.

FIG. 8 illustrates an example of a maliciously-secure OLE protocol 800 to which an LHE method is applied according to one or more example embodiments.

Referring to FIG. 8, phases of an OLE protocol of a maliciously-secure model $$\prod_{OLE}^{active}$$

are illustrated.

The OLE protocol of $$\prod_{OLE}^{passive}$$

illustrated in FIG. 7 may be extended to a maliciously-secure OLE protocol through a PoK. Here, a PoK protocol from Kim, Lee, Seo, and Song (Kim, D., Lee, D., Seo, J., Song, Y.; "Toward practical lattice-based proof of knowledge from hint-mlwe"; Annual International Cryptology Conference. pp. 549-580; Springer (2023)) may be used for the BFV encryption scheme. A core idea of Kim, Lee, Seo, and Song is to measure the leakage of a secret key when a transcript is revealed to an adversary during the PoK protocol. The leakage of the secret key may be measured by analyzing a conditional distribution of the secret key over the transcript. A main result of Kim, Lee, Seo, and Song is that the distribution of the noise can be hidden with additional noise of sub-linear size instead of super-polynomial size. More specifically, consider the scenario where a prover has an encryption $Enc_p(x, e)$ for a message x and a noise e, and a verifier learns a distribution of $\alpha_i \cdot e + f_i$ for an i-th challenge $\alpha_i$. Instead of hiding the distribution of "e" through noise flooding with $f_i$, given $(e, \alpha_1 \cdot e + f_1, \ldots, \alpha_\ell \cdot e + f_\ell)$, the conditional distribution of "e" may be measured and a small-yet-sufficient size of $f_i$ $(1 \le i \le \ell)$ may be selected. In a similar way, an OLE protocol that is secure against a malicious adversary may be constructed by measuring the leakage of the information of the messages x, and a and b, using a convolution lemma.

Referring to FIG. 8, a first PoK protocol ($\Pi_{PoK1}$) for an encryption phase is described with reference to FIG. 9, and a second Pok protocol ($\Pi_{PoK2}$) for an evaluation phase is described with reference to FIG. 10. Similar to the semi-honest OLE protocol described above with reference to FIG. 7, $B_{\rho 1}$, $B_{\rho 2}$, $B_{\sigma 1}$, $B_{\sigma 2}$, $B_{\tau 1}$, and $B_{\tau 2}$ may indicate required upper limits of $D_{\mathbb{Z}^n, \rho_1}$, $D_{\mathbb{Z}^n, \rho_2}$, $D_{a+t\mathbb{Z}^n, \sigma_1}$, $D_{a+t\mathbb{Z}^n, \sigma_2}$, $D_{\mathbb{Z}^n, \tau_1}$, and $D_{\mathbb{Z}^n, \tau_2}$, respectively, for any $a \in R_t$.

For comparison with LowGear, a typical technique for MPC preprocessing, a challenge space may be set to C={0, 1}.

Security Proof. To provide the security analysis of the maliciously-secure OLE protocol $$\Pi_{OLE}^{active},$$

first show that a parameter includes the slackness of PoK, and then show that the PoK is indeed a proper PoK and compiled to the maliciously-secured OLE protocol.

Referring to FIG. 8, in the encryption phase and the evaluation phase, the receiver and the sender generate c and c', respectively, and each of c and c' is provided along with PoK to ensure that it is well-formed. As in a typical lattice-based PoK, there is a difference between an honest language and a proven language.

The $\Pi_{PoK1}$ protocol 900 is now described with reference to FIG. 9.

The witness relationship for PoK1 is defined as expressed in Equations 28 and 29 below.

$$R_1 = \{(c, x, e) \mid c = Enc_p(x, e), \|e\|_\infty \le B_{\rho_1}\} \quad \text{Equation 28}$$

$$R_1' = \{(c, x, e) \mid c = Enc_p(x, e), \|e\|_\infty \le B_\rho'\} \quad \text{Equation 29}$$

In Equation 29, $B'\rho = 2(B_{\rho 1} + B_{\rho 2})$. In this case, (x, e) may be considered a witness to a statement about a ciphertext c. The honest language and the proved language may be expressed as Equations 30 and 31, respectively.

$$L_1 = \{c \in R_q^2 \mid \exists (x, e) \in R_t \times R^3, (c, x, e) \in R_1\} \quad \text{Equation 30}$$

$$L_1' = \{c \in R_q^2 \mid \exists (x, e) \in R_t \times R^3, (c, x, e) \in R_1'\} \quad \text{Equation 31}$$

The $\Pi_{PoK2}$ 1000 protocol is now described with reference to FIG. 10.

Similar to PoK1, the witness relationship for PoK2 is defined as expressed in Equations 32 and 33, respectively.

$$R_2 = \{(c', b, r, e') \mid c' = rc + Enc_p(b, e'), \|r\|_\infty \le B_{\sigma_1}, \|e'\|_\infty \le B_{\tau_1}\} \quad \text{Equation 32}$$

$$R_2' = \{(c', b, r, e') \mid c' = rc + Enc_p(b, e'), \|r\|_\infty \le B_\sigma', \|e'\|_\infty \le B_\tau'\} \quad \text{Equation 33}$$

Here, $B'\sigma = 2(B_{\sigma 1} + B_{\sigma 2})$, and $B'_\tau = 2(B_{\tau 1} + B_{\tau 2})$. The honest language and the proven language may then be expressed as Equations 34 and 35, respectively.

$$L_2 = \{c' \in R_q^2 \mid \exists (b, r, e') \in R_t \times R \times R^3, (c', b, r, e') \in R_2\} \quad \text{Equation 34}$$

$$L_2' = \{c' \in R_q^2 \mid \exists (b, r, e') \in R_t \times R \times R^3, (c', b, r, e') \in R_2'\} \quad \text{Equation 35}$$

In other words, the sender provides PoK that c' is generated honestly by evaluating a linear function. Further, PoK2 relies on the proven language of PoK1.

Lemma 10 (Correctness)

If both the sender and the receiver honestly follow the protocol and $(nB_{\rho 1}B_{\sigma 1} + B_{\tau 1})(1 + n + nB_{\rho 1}) < \Delta/2$, then $$\Pi_{OLE}^{passive}$$

realizes a correct OLE functionality.

The OLE protocol that provides simplified lemmas, to which the LHE method of one or more example embodiments is applied, may achieve security against both a malicious sender and a malicious receiver.

Lemma 11

Assume that σ1, σ2>0 are real numbers, and assume $\alpha_1, \ldots, \alpha_\ell \in \{0, 1\}$ for any integer $\ell \ge 0$. Assume that $\sigma'_0 > 0$ satisfies $$1/\sigma_0'^2 = 1/\sigma_1^2 + \ell'/\sigma_2^2,$$

where $\ell'$ is the number of i in which $\alpha_i = 1$. Then, for any coset $a + t\mathbb{Z}^n$, the following procedures may produce statistically identical distributions on $(a + t\mathbb{Z}^n \times \mathbb{Z}^n \times \ldots \times \mathbb{Z}^n)$.

(i) Sample $r \leftarrow D_{a+t\mathbb{Z}^n, \sigma_1}$. Sample $u_i \leftarrow D_{\mathbb{Z}^n, \sigma_2}$ and leave $v_i = u_i + \alpha_i r$ for $1 \le i \le \ell$. Return $(r, v_1, \ldots, v_\ell)$.

(ii) Sample $r \leftarrow D_{a+t\mathbb{Z}^n, \sigma_1}$. Sample $u_i \leftarrow D_{\mathbb{Z}^n, 94_2}$ and leave $v_i = u_i + \alpha_i r$ for $1 \le i \le \ell$. Sample $\hat{r} \leftarrow$ $$D_{a+t\mathbb{Z}^n (\sigma_0'^2/\sigma_2'^2) \cdot \sum_{i=1}^{\ell} \alpha_i v_i, \sigma_0'},$$

and return ($\hat{r}$, $v_1, \ldots, v_\ell$). Even when the coset $a+t\mathbb{Z}^n$ is replaced with $\mathbb{Z}^n$, statistical equality still holds.

Lemma 12

Assume that the same condition as Lemma 11 is given.

$$\text{If } \sigma_0' \geq \eta_\epsilon(t\mathbb{Z}^n)$$

for $0<\epsilon\leq 1/2$, then a distribution of ($v_1, \ldots, v_\ell$) is within a statistical distance $2\epsilon$ from a distribution independent of "a."

Lemma 13 (PoK1)

Assume that $\rho_0>0$ is a real number that satisfies $$1/\rho_0^2 = 1/\rho_1^2 + \ell/\rho_2^2.$$

If $\rho_0\geq 2.\ \eta_\epsilon(\mathbb{Z}^n)$ for some negligible $\epsilon>_0$, and $2^{-\ell}$ is negligible, then $\Pi_{PoK1}$ is a secure PoK protocol for a language pair ($L_1$, $L'_1$) under the hardness assumptions of RLWE(n, q, $\rho$, $\chi$) and RLWE(n, q, $\rho_0/\sqrt{2}$, $\rho_0/\sqrt{2}$).

Lemma 13 (PoK2)

Assume that $\sigma_0$, $\tau_0$ are real numbers that satisfy $$1/\sigma_0^2 = 1/\sigma_1^2 + \ell/\sigma_2^2 \text{ 와 } 1/\tau_0^2 = 1/\tau_1^2 + \ell/\tau_2^2.$$

If $\sigma\sigma_0\geq\eta_\epsilon(t\mathbb{Z}^n)$ and $\tau_0\geq\eta_\epsilon(\mathbb{Z}^n)$ for some negligible $\epsilon>0$, then the protocol $$\prod_{OLE}^{passive}$$

achieves security against a malicious sender. Moreover, if $2^{-\ell}$ is negligible, then $\Pi_{PoK2}$ is a secure PoK protocol for the honest language $L_2$ and the proved language $$L_2'.$$

TABLE 1

| log t | n | $\rho_0$ | log $\sigma_0$ | log $\tau_0$ | log q |
|---|---|---|---|---|---|
| 16 | $2^{12}$ | 11.15 | 18 | 38 | 77 |
| 32 | $2^{13}$ | 11.19 | 34 | 55 | 111 |
| 64 | $2^{13}$ | 11.19 | 66 | 87 | 175 |
| 80 | $2^{13}$ | 11.19 | 82 | 103 | 207 |
| 128 | $2^{14}$ | 11.23 | 130 | 152 | 305 |

Table 1 lists five different parameter sets that support plaintext moduli of different bit lengths for malicious OLE. The parameter sets correspond to plaintext moduli of 16, 32, 64, 80, and 128 bits. In the security proofs described above, the challenge set is set to C={0, 1}, but a monomial challenge space may be used to optimize the number of challenges. The security proofs may be extended to a monomial challenge set. The extension may require two additional conditions: q needs to be an odd prime number, and encryption randomness needs to be multiplied by 2. Such a modification may ensure the correctness of the arguments to a knowledge extractor. As a result, the size of the challenge space may become 2n, and thus may be set to $\ell=\lceil\lambda/\log_2(2n)\rceil$ for the security parameter $\lambda$.

Most communication during the OLE protocol to which the LHE method of one or more example embodiments is applied may be elements of a polynomial ring $R_q=\mathbb{Z}_q[X]/(X^n+1)$. These elements may be represented as coefficient vectors of size n, where each element is bounded by q. Therefore, for both semi-honest OLE and maliciously-secured OLE, the communication cost is roughly proportional to n log q. To minimize the communication cost, a plaintext modulus t may be fixed, and q and n may be set as small as possible.

MPC Preprocessing

The LHE method of one or more example embodiments may be applied to MPC preprocessing.

The LowGear protocol, which is an example of MPC preprocessing, follows the framework of SPDZ and uses LHE of the BGV scheme to preprocess so-called (authenticated) Beaver's triples. It also deploys noise flooding and ZKPoPK on BGV to achieve security. The LowGear protocol may be plugged with circuit-private LHE instead of BGV and noise flooding, and the performance of the protocol depends on the underlying LHE scheme and the accompanying ZKPoPK.

To improve the LowGear protocol, the LHE method of one or more example embodiments may be plugged into the LowGear protocol to provide circuit privacy, and ZKPoPK may be deployed. Similar to the BGV scheme, high parallelism may be achieved while avoiding noise flooding, and thus smaller parameters may be used, thus improving the communication cost of the protocol.

Figure 11:
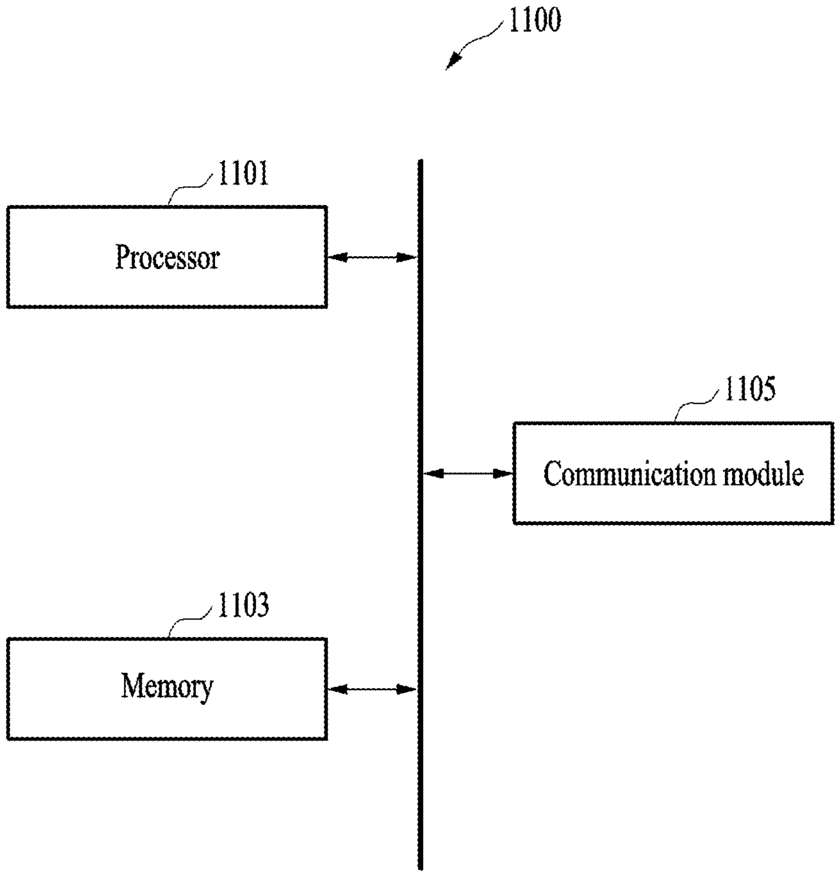
FIG. 11 illustrates an example configuration of an electronic device according to one or more example embodiments.

FIG. 11 illustrates an example configuration of an electronic device according to one or more example embodiments.

Referring to FIG. 11, an electronic device 1100 of one or more example embodiments may include a processor 1101, a memory 1103, and a communication module 1105. The electronic device 1100 of one or more example embodiments may include an apparatus that performs the LHE method described above with reference to FIGS. 1 through 10. The electronic device 1100 and the server 120 of FIG. 1 may be implemented with instances of the electronic device 1110. In an example, the electronic device 1100 may include a receiver or an electronic device of the receiver that performs the LHE method described above with reference to FIG. 2.

The processor 1101 of one or more example embodiments may perform at least one of the steps, phases, or operations of the LHE method described above with reference to FIGS. 1 through 10. For example, the processor 1101 may perform at least one of the following steps: receiving a homomorphic ciphertext of input data from a sender; sampling a coefficient of a linear function from a first discrete Gaussian distribution corresponding to a coset of a plaintext modulus; sampling a first noise from a predefined second discrete Gaussian distribution; and generating a homomorphic ciphertext of an evaluation result on the input data from the linear function based on the sampled coefficient of the linear function and the sampled first noise.

The memory 1103 of one or more example embodiments may be a volatile memory or a non-volatile memory, and may store data related to the LHE method described above with reference to FIGS. 1 through 10. In an example, the memory 1103 may store data generated in the course of performing the LHE method or data required to perform the LHE method. For example, the memory 1103 may store the coefficient of the linear function, a first width parameter, and a second width parameter.

The communication module 1105 of one or more example embodiments may provide a function that enables the electronic device 1100 to communicate with other electronic devices or other servers over a network. In other words, the electronic device 1100 may be connected to an external device (e.g., the client 110, a terminal of a sender, a server, or a network) via the communication module 1105 and exchange data with the external device.

According to one example embodiment, the memory 1103 may or may not be an integrated component of the electronic device 1100. In an example, the memory 1103 may be included in an external device accessible from the electronic device 1100. In this case, the electronic device 1100 may receive data stored in the memory 1103 included in the external device via the communication module 1105 and may transmit data to be stored in the memory 1103.

According to one example embodiment, the memory 1103 may store a program in which the LHE method described above with reference to FIGS. 1 through 10 is implemented. The processor 1101 may execute the program stored in the memory 1103 and may control the electronic device 1100. The code of the program executed by the processor 1101 may be stored in the memory 1103.

According to one example embodiment, the memory 1103 may store instructions. The instructions stored in the memory 1103 may, when executed by the processor 1101 (e.g., one or more processors), cause the electronic device 1100 to: receive a homomorphic ciphertext of input data from a sender; sample a coefficient of a linear function from a first discrete Gaussian distribution corresponding to a coset of a plaintext modulus; sample a first noise from a predefined second discrete Gaussian distribution; and generate a homomorphic ciphertext of an evaluation result from the linear function on the input data, based on the sampled coefficient of the linear function and the sampled first noise.

The electronic device 1100 of one or more example embodiments may further include other components not shown. For example, the electronic device 1100 may further include an input/output interface including an input device and an output device as a means for interfacing with the communication module 1105. For example, the electronic device 1100 may further include other components such as a transceiver, various sensors, a database (DB), and the like.

The examples described herein may be implemented using hardware components, components/modules of processor-executable instructions, and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as, parallel processors.

The instructions may be in the form of source code, binary instructions, or some combination thereof, to independently or collectively instruct and/or configure the processing device to operate as desired. The instructions and/or data may be embodied permanently or temporarily in any type of machine, component, physical or virtual equipment, computer storage medium or device, or in a propagated signal wave capable of providing instructions or data to or being interpreted by the processing device. The instructions also may be distributed over network-coupled computer systems so that the software is stored and executed in a distributed fashion. The instructions and data may be stored by one or more non-transitory computer-readable recording mediums.

The methods according to the above-described examples may be recorded in non- transitory computer-readable media including program instructions to implement various operations of the above-described examples. The media may also include, alone or in combination with the program instructions, data files, data structures, and the like. The program instructions recorded in the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as ROM, RAM, flash memory (e.g., USB flash drives, memory cards, memory sticks, etc.), and the like (but not signals per se). Examples of program instructions include both machine code, such as produced by a compiler, files containing higher-level code that may be executed by the computer using an interpreter, bytecode, or the like.

The above-described hardware devices may be configured to act as one or more software modules in order to perform the operations of the above-described examples, or vice versa.

The computing apparatuses, the electronic devices, the processors, the memories, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A linearly homomorphic encryption (LHE) method that provides circuit privacy, the LHE method performed by one or more processors of a first computing device, the LHE method comprising:

receiving, via a network by the first computing device, a homomorphic ciphertext of input data from a sender comprising a second computing device;

sampling, by the first computing device, a coefficient of a linear function from a first discrete Gaussian distribution corresponding to a coset of a plaintext modulus;

sampling, by the first computing device, a first noise from a predefined second discrete Gaussian distribution;

generating, by the first computing device, based on the sampled coefficient of the linear function and the sampled first noise, a homomorphic ciphertext of an evaluation result on the input data from the linear function; and transmitting the homomorphic ciphertext from the first computing device via the network to the second computing device.

2. The LHE method of claim 1, wherein the homomorphic ciphertext of the input data is generated by encrypting a result of a number-theoretic transform (NTT) operation corresponding to the plaintext modulus of the input data, based on a public key corresponding to a secret key of the sender and a second noise sampled from a third discrete Gaussian distribution.

3. The LHE method of claim 1, wherein the receiving of the homomorphic ciphertext of the input data comprises:

further receiving a public key corresponding to the homomorphic ciphertext of the input data.

4. The LHE method of claim 1, wherein the generating of the homomorphic ciphertext of the evaluation result comprises:

encrypting a constant term of the linear function, based on a public key corresponding to the homomorphic ciphertext of the input data, the first noise, and a ciphertext modulus; and generating the homomorphic ciphertext of the evaluation result by adding the encrypted constant term of the linear function to a product of the sampled coefficient of the linear function and the homomorphic ciphertext of the input data.

5. The LHE method of claim 1, wherein the linear function is defined based on a slope coefficient and a constant term coefficient on a polynomial ring and a residue ring for the plaintext modulus.

6. The LHE method of claim 1, wherein the homomorphic ciphertext of the input data comprises a Brakerski/Fan-Vercauteren (BFV) ciphertext.

7. The LHE method of claim 1, wherein the first discrete Gaussian distribution comprises:

a discrete Gaussian distribution corresponding to a first width parameter in an integer lattice space of the coset of the plaintext modulus that is an equivalence class of a modulo operation on the coefficient of the linear function and the plaintext modulus.

8. The LHE method of claim 1, wherein the second discrete Gaussian distribution comprises:

a discrete Gaussian distribution in an integer lattice space corresponding to a second width parameter.

9. The LHE method of claim 1, wherein a first width parameter of the first discrete Gaussian distribution and a second width parameter of the second discrete Gaussian distribution are determined based on a smoothing parameter of an integer lattice space of the coset and a stochastic maximum value of a third discrete Gaussian distribution in which a second noise corresponding to the homomorphic ciphertext of the input data is sampled.

10. The LHE method of claim 1, further comprising:

transmitting the homomorphic ciphertext of the evaluation result to the sender.

11. The LHE method of claim 1, wherein the sender is configured to acquire the evaluation result on the input data from the linear function by decrypting the homomorphic ciphertext of the evaluation result based on a secret key corresponding to the homomorphic ciphertext of the input data.

12. A non-transitory computer-readable storage medium storing instructions that, when executed by one or more processors, cause the one or more processors to perform the LHE method of claim 1.

13. An electronic device, comprising:

one or more processors; and a memory storing instructions, wherein the instructions, when executed by the one or more processors, cause the one or more processors to:

receive a homomorphic ciphertext of input data from a sender computing device via a network;

sample a coefficient of a linear function from a first discrete Gaussian distribution corresponding to a coset of a plaintext modulus;

sample a first noise from a predefined second discrete Gaussian distribution;

generate, based on the sampled coefficient of the linear function and the sampled first noise, a homomorphic ciphertext of an evaluation result on the input data from the linear function; and transmit the homomorphic ciphertext to the sender computing device.

14. The electronic device of claim 13, wherein the homomorphic ciphertext of the input data is generated by encrypting a result of a number-theoretic transform (NTT) operation corresponding to the plaintext modulus of the input data, based on a public key corresponding to a secret key of the sender and a second noise sampled from a third discrete Gaussian distribution.

15. The electronic device of claim 13, wherein the receiving of the homomorphic ciphertext of the input data comprises:

further receiving a public key corresponding to the homomorphic ciphertext of the input data.

16. The electronic device of claim 13, wherein the generating of the homomorphic ciphertext of the evaluation result comprises:

encrypting a constant term of the linear function, based on a public key corresponding to the homomorphic ciphertext of the input data, the first noise, and a ciphertext modulus; and generating the homomorphic ciphertext of the evaluation result by adding the encrypted constant term of the linear function to a product of the sampled coefficient of the linear function and the homomorphic ciphertext of the input data.

17. The electronic device of claim 13, wherein the first discrete Gaussian distribution comprises:

a discrete Gaussian distribution corresponding to a first width parameter in an integer lattice space of the coset of the plaintext modulus that is an equivalence class of a modulo operation on the coefficient of the linear function and the plaintext modulus.

18. The electronic device of claim 13, wherein the second discrete Gaussian distribution comprises:

a discrete Gaussian distribution in an integer lattice space corresponding to a second width parameter.

19. The electronic device of claim 13, wherein a first width parameter of the first discrete Gaussian distribution and a second width parameter of the second discrete Gaussian distribution are determined based on a smoothing parameter of an integer lattice space of the coset and a stochastic maximum value of a third discrete Gaussian distribution in which a second noise corresponding to the homomorphic ciphertext of the input data is sampled.

20. The electronic device of claim 13, wherein the instructions, when executed by the one or more processors, cause the electronic device further to:

transmit the homomorphic ciphertext of the evaluation result to the sender.

* * * * *